(12) United States Patent
Daniel et al.

(10) Patent No.: US 11,476,026 B2
(45) Date of Patent: Oct. 18, 2022

(54) METHODS AND APPARATUS FOR A MAGNETIC PROPULSION SYSTEM

(71) Applicant: PARANETICS, INC., San Diego, CA (US)

(72) Inventors: Thomas A. Daniel, San Diego, CA (US); Larry G. Stambaugh, San Diego, CA (US)

(73) Assignee: PARANETICS, INC., San Diego, CA (US)

( * ) Notice: Subject to any disclaimer, the term of this patent is extended or adjusted under 35 U.S.C. 154(b) by 215 days.

(21) Appl. No.: 16/791,820

(22) Filed: Feb. 14, 2020

(65) Prior Publication Data

US 2020/0265983 A1    Aug. 20, 2020

Related U.S. Application Data

(60) Provisional application No. 62/805,775, filed on Feb. 14, 2019.

(51) Int. Cl.
*H01F 7/02* (2006.01)
*B64D 35/04* (2006.01)
(Continued)

(52) U.S. Cl.
CPC ........... *H01F 7/0273* (2013.01); *B64D 35/04* (2013.01); *F03G 7/111* (2021.08); *H02K 1/17* (2013.01); *H02K 1/27* (2013.01); *H02K 7/14* (2013.01)

(58) Field of Classification Search
CPC ..... H01F 7/0273; H01F 7/0221; B64D 35/04; B64D 27/24; F03G 7/111; H02K 1/17;
(Continued)

(56) References Cited

U.S. PATENT DOCUMENTS

| 4,568,901 A | 2/1986 | Adam |
| 4,998,084 A | 3/1991 | Alff |

(Continued)

FOREIGN PATENT DOCUMENTS

| CN | 107078621 A | 8/2017 |
| EP | 3204635 A2 | 8/2017 |

(Continued)

OTHER PUBLICATIONS

International Search Report and Written Opinion received in PCT/US2016/060858, dated Feb. 23, 2017, 8 pages.

(Continued)

*Primary Examiner* — Joseph Ortega
(74) *Attorney, Agent, or Firm* — Procopio, Cory, Hargreaves & Savitch LLP

(57) ABSTRACT

A propulsion system, comprising: a fan blade housing; a plurality of fan blades within the fan blade housing; one or more rows of permanent magnets, affixed to the outside of the fan blade housing; one or more fan blade bearings; one or more magnetic field generators affixed to the one or more fan blade bearings and corresponding to the one or more rows of permanent magnets, the magnetic field generators configured to cause the permanent magnets to be propelled forward in the same direction, thereby causing the fan blade housing to which they are attached, and the fan blades within, to spin.

9 Claims, 20 Drawing Sheets

(51) Int. Cl.
  *H02K 7/14* (2006.01)
  *H02K 1/27* (2022.01)
  *H02K 1/17* (2006.01)
  *F03G 7/10* (2006.01)

(58) Field of Classification Search
  CPC ............ H02K 1/27; H02K 7/14; H02K 21/26; H02K 53/00; B64C 39/024; B64C 2201/042; B64C 2201/162; B64C 11/001; Y02T 50/40; Y02T 50/60
  See application file for complete search history.

(56) References Cited

U.S. PATENT DOCUMENTS

| | | | |
|---|---|---|---|
| 5,182,533 | A | 1/1993 | Ritts |
| 5,502,425 | A | 3/1996 | Tsai |
| 5,523,732 | A | 6/1996 | Leupold |
| 6,084,494 | A | 7/2000 | Chew et al. |
| 6,401,872 | B1 | 6/2002 | Morishita |
| 6,510,925 | B1 | 1/2003 | De Jong |
| 6,606,578 | B1 * | 8/2003 | Henderson ............ B64D 27/24 702/145 |
| 6,758,146 | B2 | 7/2004 | Post |
| 6,822,441 | B1 | 11/2004 | Moreno et al. |
| 6,979,925 | B2 | 12/2005 | Schwamm |
| 7,501,922 | B2 | 3/2009 | Kazadi |
| 7,531,929 | B2 | 5/2009 | Tong et al. |
| 7,924,128 | B2 | 4/2011 | Ito et al. |
| 8,338,976 | B2 | 12/2012 | Kazadi |
| 8,350,663 | B1 | 1/2013 | Michael |
| 8,638,186 | B1 | 1/2014 | LaPoint |
| 8,850,989 | B2 | 10/2014 | Hunter |
| 9,336,935 | B2 | 5/2016 | Michaelis |
| 9,419,483 | B2 | 8/2016 | Hunstable |
| 9,831,752 | B2 | 11/2017 | Dien |
| 2007/0205854 | A1 | 9/2007 | Kazadi |
| 2008/0100163 | A1 | 5/2008 | Storaasli |
| 2008/0174119 | A1 | 7/2008 | Hu |
| 2009/0179505 | A1 | 7/2009 | Hoppe et al. |
| 2011/0062716 | A1 | 3/2011 | Zeuthen et al. |
| 2011/0127774 | A1 | 6/2011 | Van Schepdael |
| 2012/0093669 | A1 | 4/2012 | Gieras et al. |
| 2014/0085024 | A1 | 3/2014 | Kuriyama |
| 2014/0111047 | A1 | 4/2014 | Hashish et al. |
| 2014/0319954 | A1 | 10/2014 | Dien |
| 2015/0001976 | A1 | 1/2015 | Hunstable |
| 2015/0042427 | A1 | 2/2015 | Kocijan |
| 2015/0213934 | A1 | 7/2015 | Michaelis |
| 2017/0263362 | A1 * | 9/2017 | Daniel ................... H02K 53/00 |
| 2017/0284365 | A1 | 10/2017 | Yanez Villarreal |

FOREIGN PATENT DOCUMENTS

| | | |
|---|---|---|
| JP | 2007214393 A | 8/2007 |
| KR | 1020140110882 A | 9/2014 |
| WO | 2014016575 A1 | 1/2014 |
| WO | 2016055370 A2 | 4/2016 |
| WO | 2018149971 A1 | 8/2018 |

OTHER PUBLICATIONS

International Preliminary Report received in PCT/US2016/060858, dated Aug. 2, 2018, 7 pages.
Extended European Search Report for related European Application No. EP 16886772 dated Aug. 13, 2019 (8 pages).
Chinese Office Action from corresponding Chinese Patent Application No. 2016800787828 dated Mar. 2, 2020 (10 pages).
International Search Report and Written Opinion for related PCT Application No. PCT/US2020/018456, dated Jun. 30, 2020, in 11 pages.

* cited by examiner

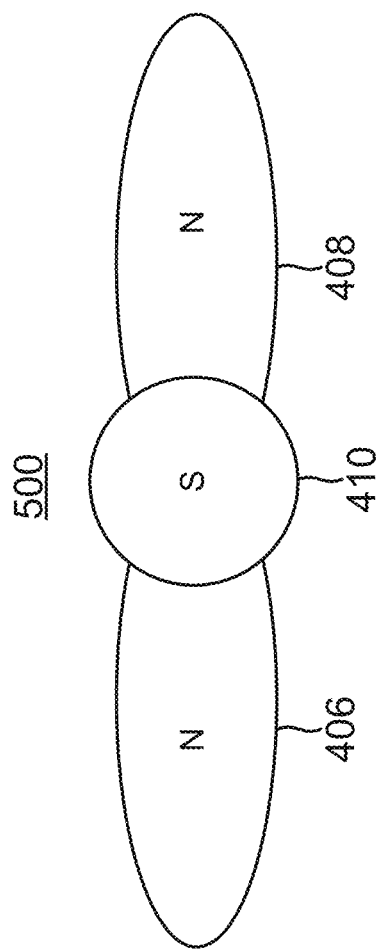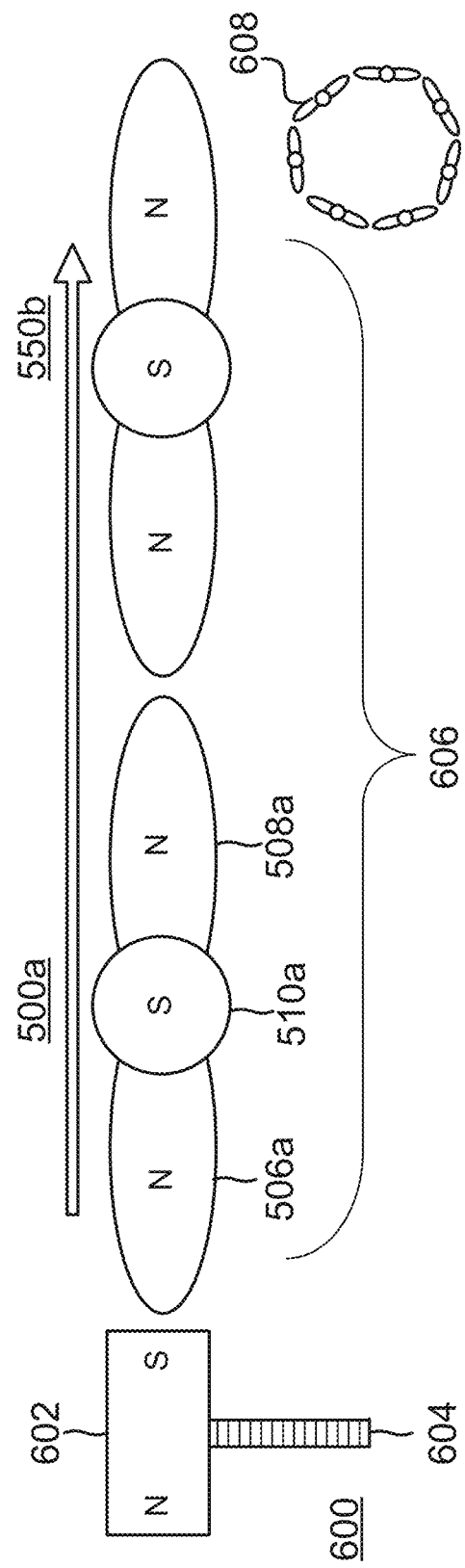

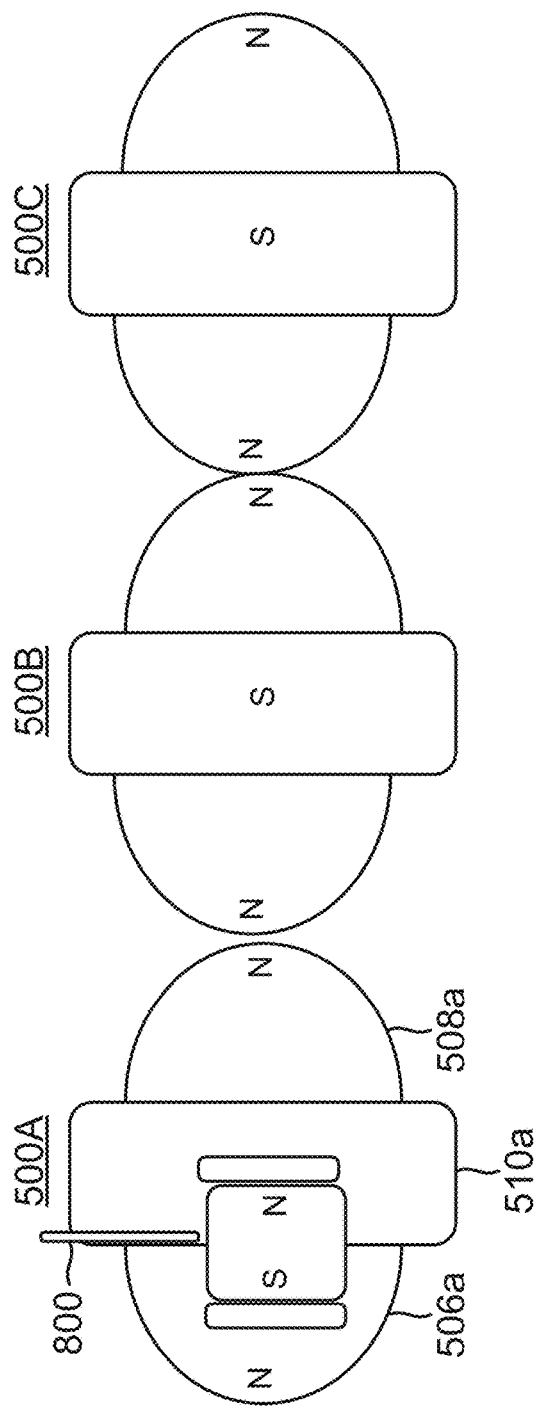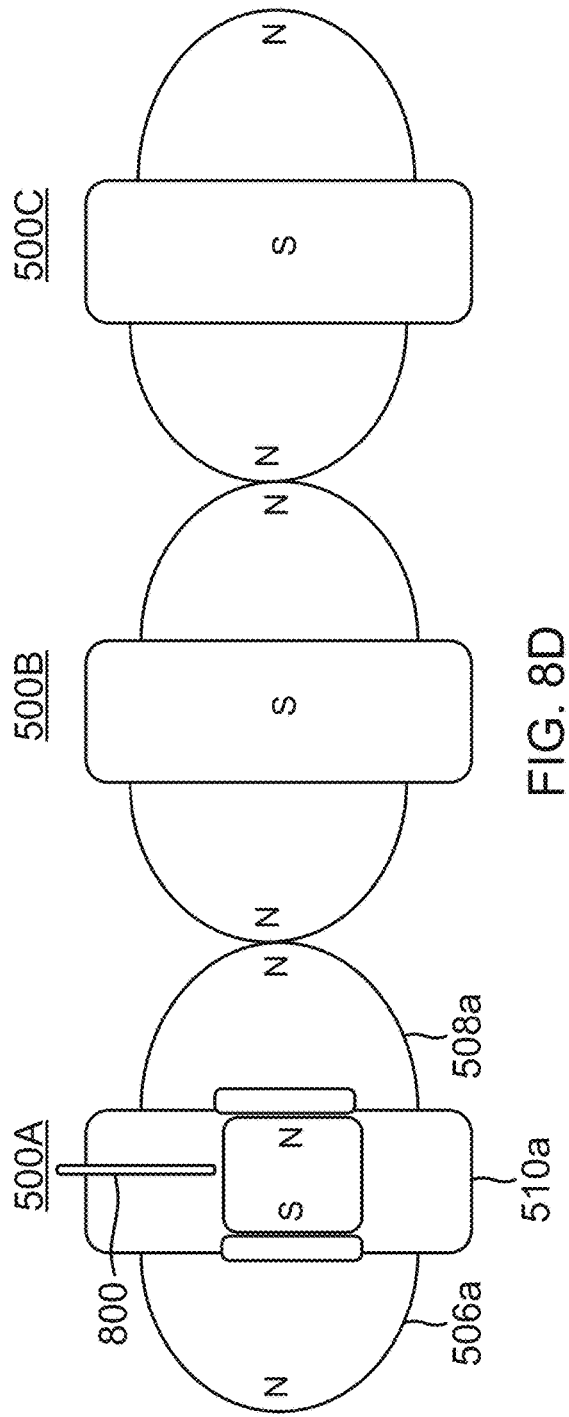

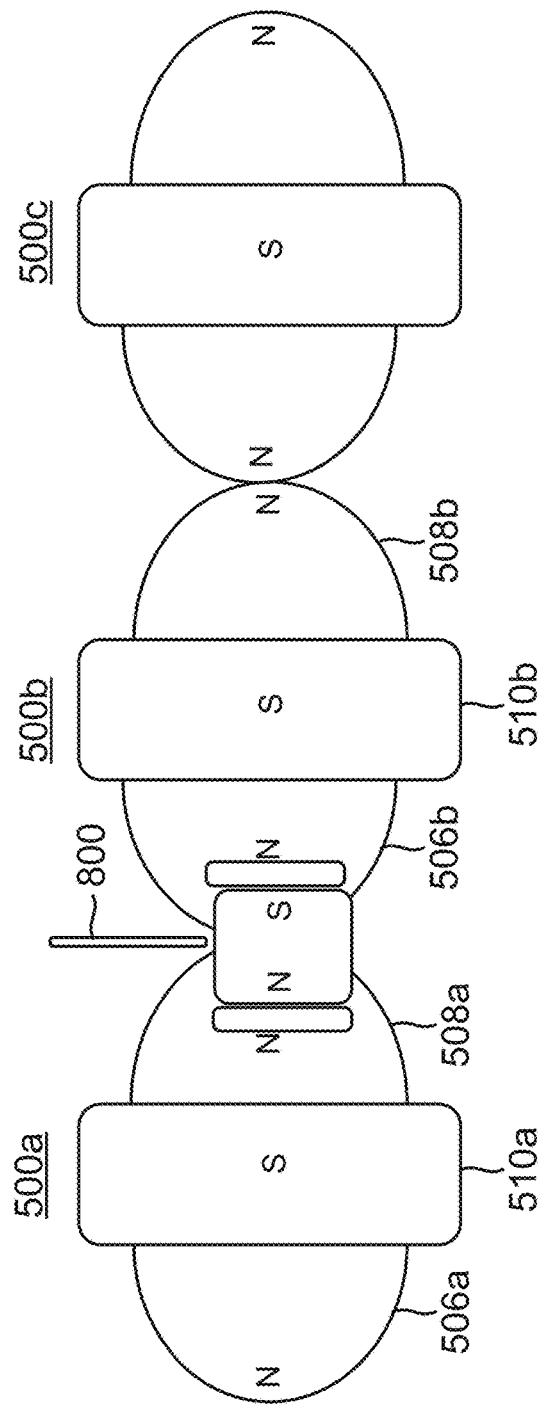
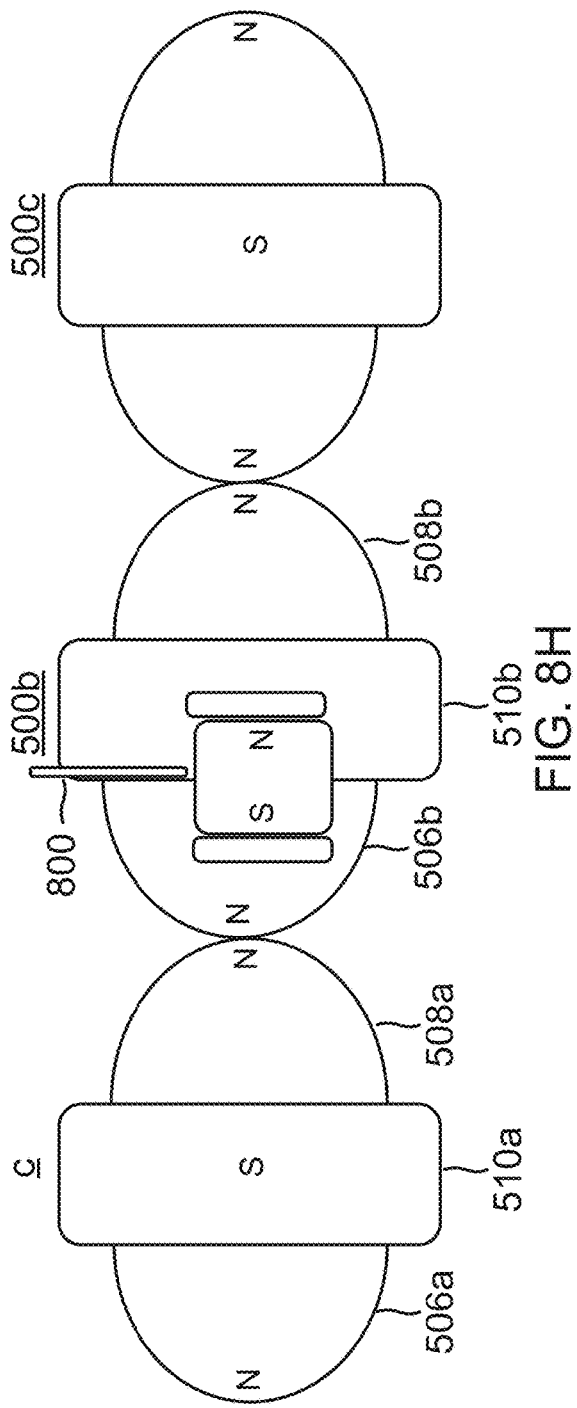

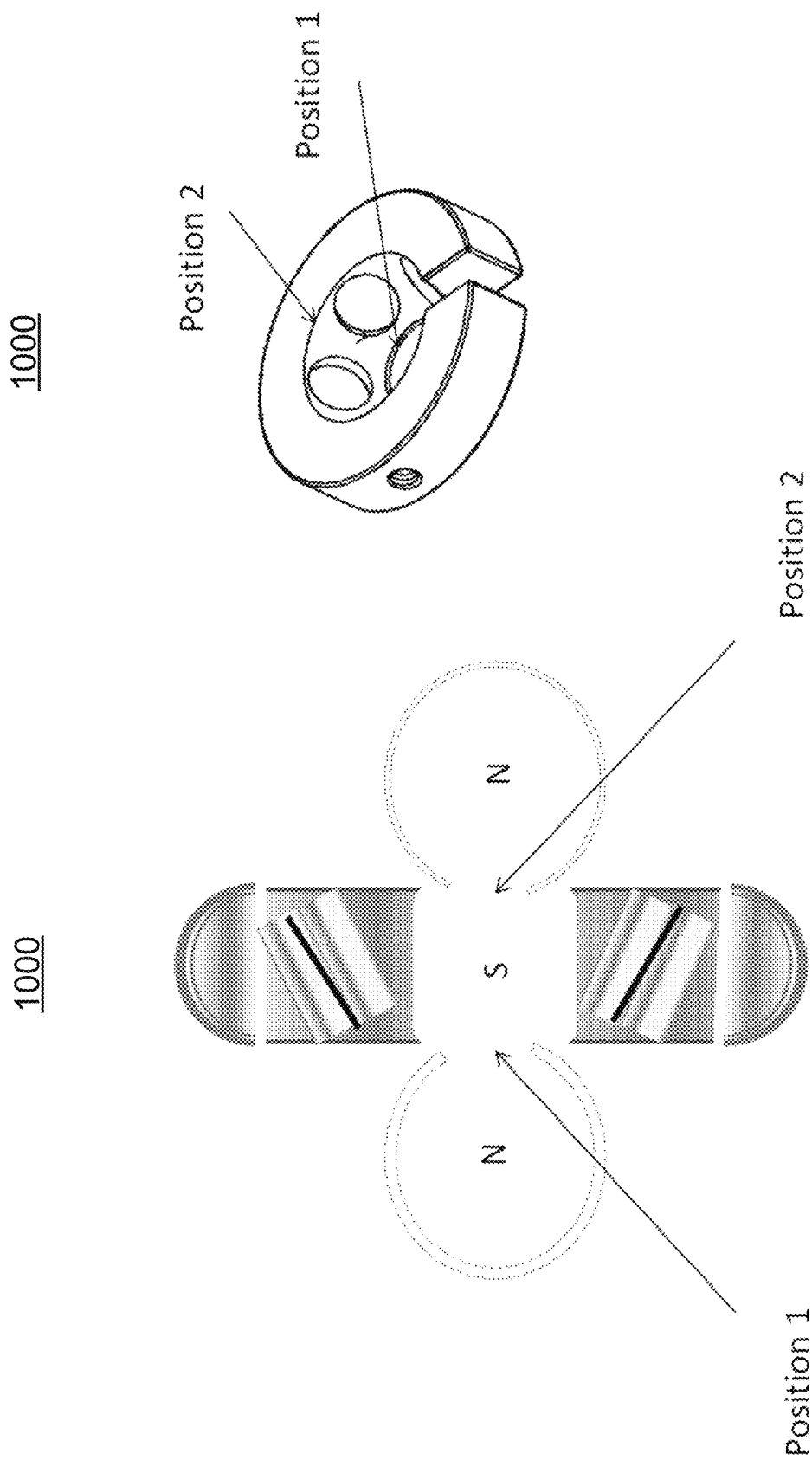

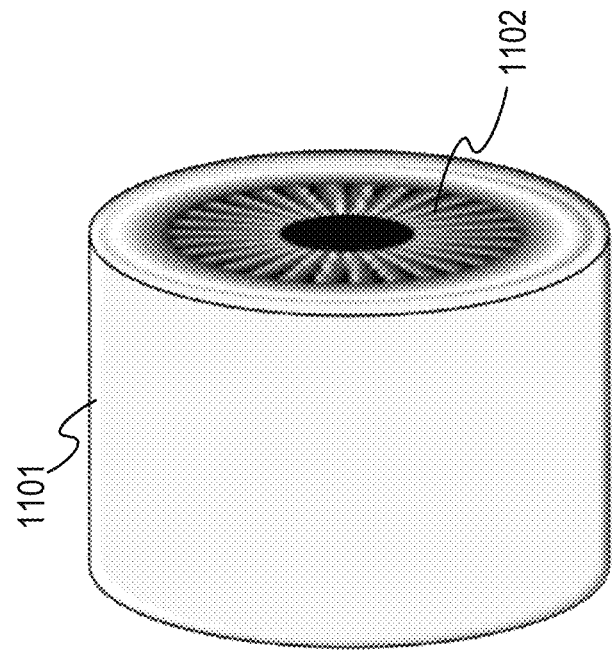
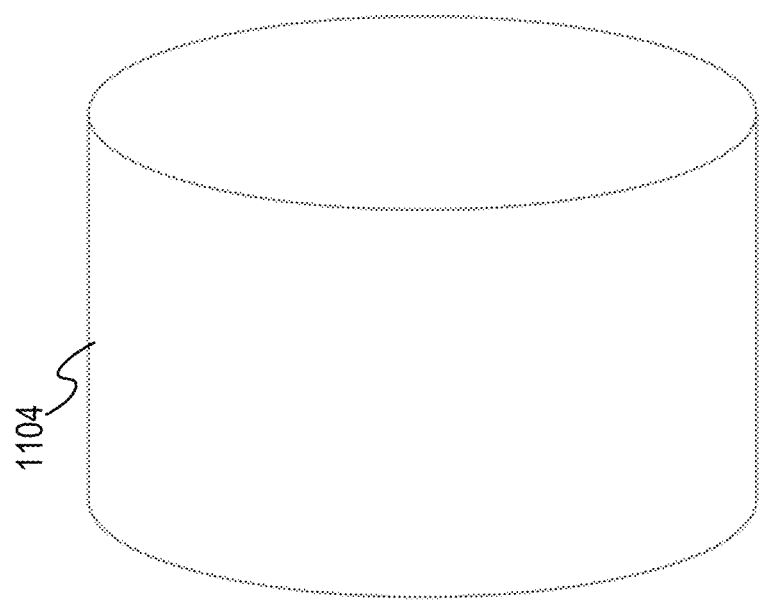
FIG. 11B

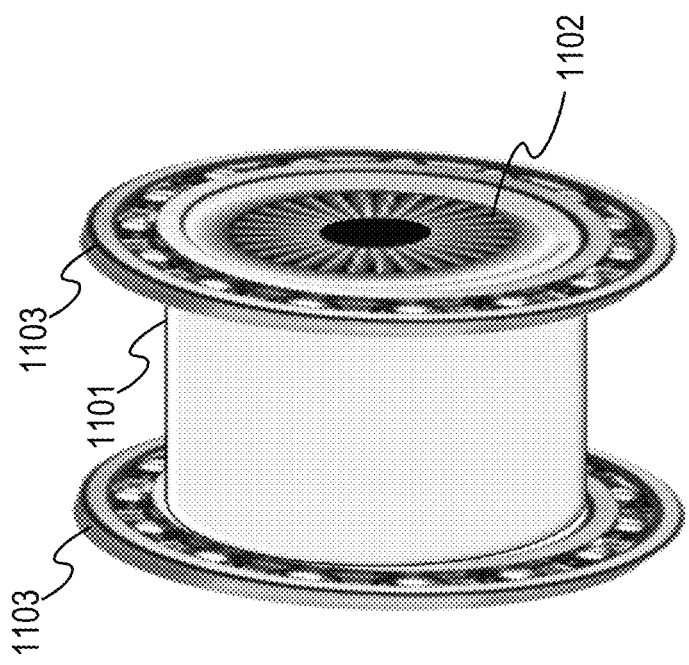
FIG. 11D
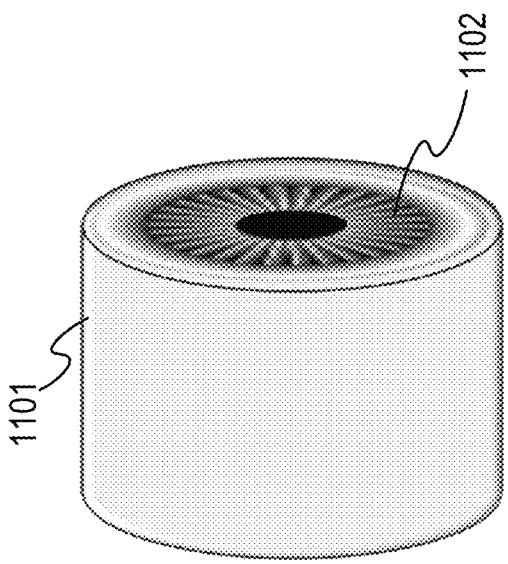
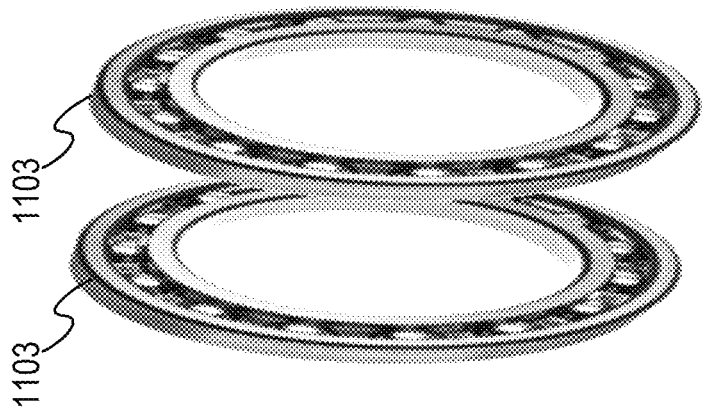
FIG. 11C

METHODS AND APPARATUS FOR A MAGNETIC PROPULSION SYSTEM

CROSS REFERENCE TO RELATED APPLICATIONS

This application claims the benefit under 35 USC 119(e) to U.S. Provisional Pat. App. No. 62/805,775 filed on Feb. 14, 2019, which is incorporated here as if set forth in full.

BACKGROUND

1. Technical Field

The embodiments described herein are related to generating magnetic fields, and more particularly to the generation of magnetic fields with multiple polarities.

2. Related Art

Magnets of all kinds, e.g., permanent, electromagnetic, and superconducting magnets generate two magnetic poles of opposite polarity at opposite sides. This can be illustrated by reference to the bar magnet 100 shown in FIG. 1. As can be seen in FIG. 1, bar magnet 100 has two magnetic poles: south pole 102 and north pole 104, respectively. FIG. 1 also shows magnetic field 106 generated by bar magnet 100 which has a direction going from the north pole 104 to south pole 102.

These magnetic poles have the ability to repel and attract. For example, if the north pole of a second bar magnet is to be brought near, e.g., the south pole 102 of magnet 100, then magnet 100 would attract the second magnet. Conversely, if the south pole of the second magnet is to be brought near the south pole 102 of magnet 100, then magnet 100 would repel the second magnet. The north pole 104 of magnet 100 will operate in a converse fashion, i.e., repelling the north pole and attracting the south pole of the second magnet.

While the above described property of magnets can be used to create devices, it can also limit their uses or at least limit their efficiency. This can be illustrated by a stator/rotator combination of an electric motor.

FIG. 2 presents a block diagram illustrating multiple magnets 202 forming a stator ring, and a rotator magnet 204 positioned in the middle of the stator ring. As can be seen in FIG. 2, each of the magnets 202 (i.e., 202a-202d) has the south and north magnetic poles arranged as indicated, and the rotator magnet 204 has its poles arranged as shown. During operation, the south poles of stator magnets 202a and 202d will repel the south pole of rotator magnet 204, while the north poles of stator magnets 202b and 202c will attract the south pole of rotator magnet 204. At the same time, the north poles of stator magnets 202b and 202c will repel the north pole of rotator magnet 204 while the south poles of stator magnets 202d and 202a will attract the north pole of rotator magnet 204. The cumulative effect causes rotator magnet 204 to rotate clockwise around a shaft 205. Unfortunately, as can be seen in FIG. 2, each of stator magnets 202 generates a second pole on the outside of the stator ring that is not used. As a result, the overall utilization of the stator's available magnetic fields is 50% at best.

SUMMARY

In one aspect, a propulsion system, comprising: a fan blade housing; a plurality of fan blades within the fan blade housing; one or more rows of permanent magnets, affixed to the outside of the fan blade housing; one or more fan blade bearings; one or more magnetic field generators affixed to the one or more fan blade bearings and corresponding to the one or more rows of permanent magnets, the magnetic field generators configured to cause the permanent magnets to be propelled forward in the same direction, thereby causing the fan blade housing to which they are attached, and the fan blades within, to spin.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIG. 5 illustrates an approximated field pattern of the proposed magnetic device comprising the three primary fields in accordance with some embodiments described herein.

FIG. 6 illustrates an exemplary process of accelerating a device comprising a magnet attached to a rod or other stabilizing apparatus through a magnetic field formed by multiple field patterns shown in FIG. 5 in accordance with some embodiments described herein.

FIG. 8A illustrates the initial position of the electromagnetic device before entering the first north pole of field pattern 500a.

FIG. 8B illustrates the electromagnetic device completely enters the first north pole field after being attracted by the first north pole of field pattern 500a.

FIG. 8C illustrates the electromagnetic device has moved from the first north pole field into the south pole field in the middle of field pattern 500*a* under the attraction force of the south pole.

FIG. 8D illustrates the electromagnetic device has completely entered field 510*a* and the polarities of the device remain the same.

FIG. 8G illustrates the electromagnetic device moves into the first north pole field of the second field pattern 500*b* after switching the polarities.

FIG. 8H illustrates the electromagnetic device has switched polarities again from north-south back to south-north to facilitate the device to move across the second south pole field of field pattern 500*b*.

FIG. 10A shows a cross-sectional view of another example of the proposed magnetic device which includes two similar sizes openings and the associated field pattern with three poles in accordance with some embodiments described herein.

FIG. 10B shows a perspective view of the magnetic device having the two transition boundaries at the two openings in accordance with some embodiments described herein.

FIGS. 11A-11G show a fan or propulsion system constructed using the magnetic devices described herein.

DETAILED DESCRIPTION

Some embodiments described herein relate to apparatus or devices that comprise a plurality of magnets positioned to form a parabolic shape. The magnets can be permanent magnets, electromagnetic magnets, superconducting magnets, or some combination of the above. When the magnets are positioned in the parabolic shape as described herein, they can generate two primary fields of magnetic force of the same polarity extending outward from the apparatus in opposite directions and a third magnetic field substantially in the center of the apparatus of an opposite polarity.

Figure 3:
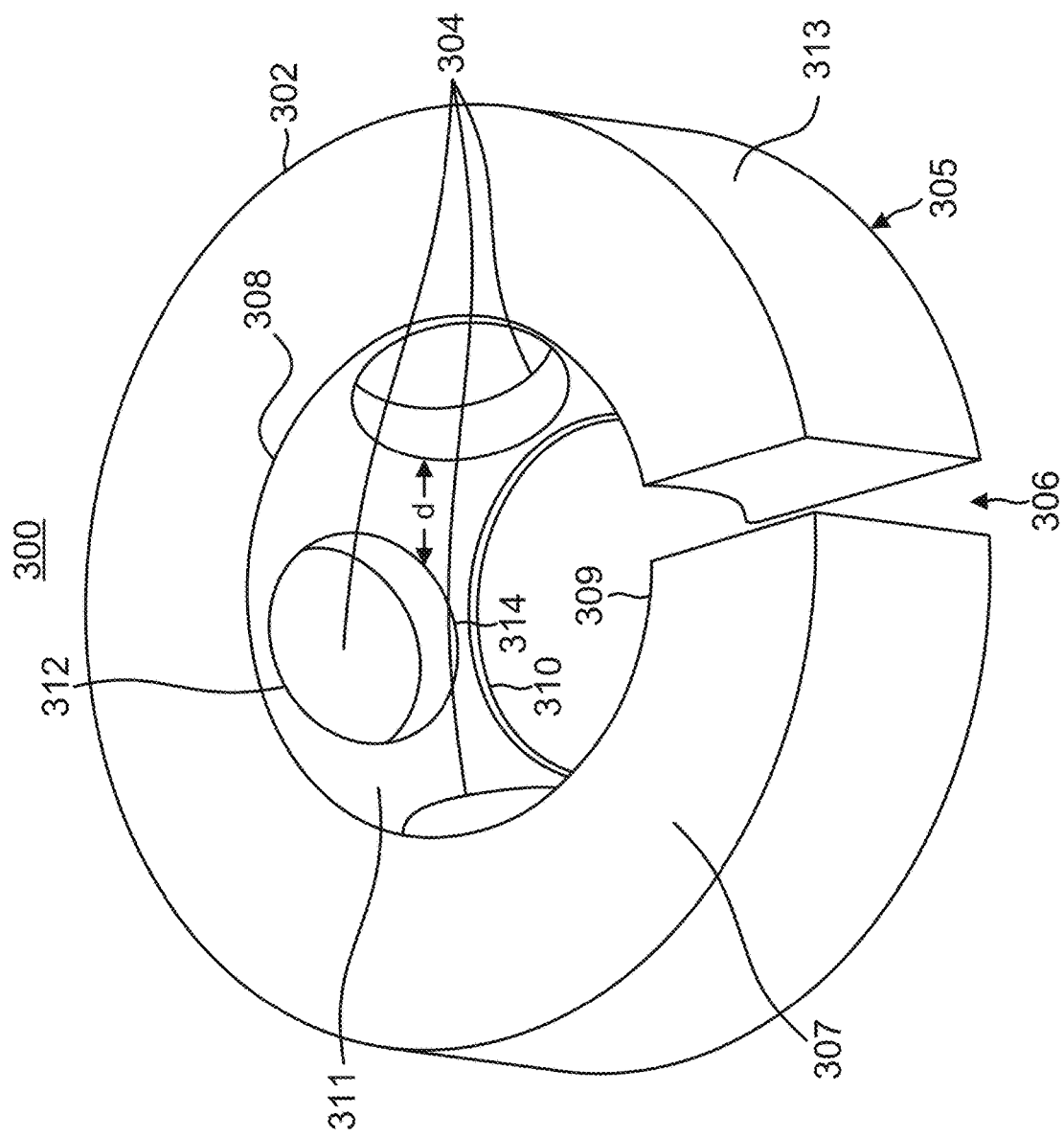
FIG. 3 illustrates an exemplary device which can be used to form a proposed magnetic device for producing a desired magnetic field pattern in accordance with some embodiments described herein.

FIG. 3 illustrates an exemplary device 300 which can be used to form a proposed magnetic device for producing a desired magnetic field pattern in accordance with some embodiments described herein. As can be seen in FIG. 3, device 300 comprises a base 302 that has a ring geometry that includes at least two openings. More specifically, base 302 has an upper surface 307, a lower surface 305, and an inner wall 311 and an outer wall 313 sandwiched between the surfaces 305 and 307. Upper surface 307 further includes an opening 308, in this case having a circular shape, while lower surface 305 includes an opening 310 which also has a circular shape in the illustrated example. Notably, opening 308 in upper surface 307 has a larger diameter than opening 310 in lower surface 305. As a result, inner wall 311 can have a parabolic shape or an angled shape. Although base 302 in the embodiment of FIG. 3 is shown to have a ring/circular shape, other embodiments of device 300 can have a base that has other closed shapes with a non-circular opening, for example, including but are not limited square, pentagon, hexagon, or other polygon shaped opening. Hence, embodiments of this disclosure are not limited to using ring-shaped bases shown in FIG. 3.

Base 302 further includes a plurality of magnet placement locations 304 that can each accommodate a magnet. As can be seen in FIG. 3, the plurality of magnet placement locations 304 are located between inner wall 311 and outer wall 313, and spaced substantially evenly around the ring-shaped base 302. For example, the distance between a pair of adjacent magnet placement locations can be denoted as "d." However, in some other embodiments, the plurality of magnet placement locations 304 can be positioned around the ring-shaped base 302 with uneven spacings. Note that each magnet placement location 304 includes an opening on the inner wall 311 to receive a magnet. As such, the opening of each magnet placement location 304 can also have a parabolic shape or an angled shape if the inner wall 311 has a parabolic shape or an angled shape. In such embodiments, due to the parabolic or angled shape of inner wall 311, each of the magnet placement locations 304 can have an upper portion 312 that is thinner than a lower portion 314.

In some embodiments, the back wall of each magnet placement location 304, which is embedded inside the solid portion of base 302, can be set at an angle with respect to the outer wall 313 of base 302. In these embodiments, the surface of the magnets to be installed into the magnet placement locations 304 can also have a parabolic or angled shape. In some embodiments, instead of using magnet placement locations configured as recesses into the inner wall, a base of the proposed magnetic device uses a set of magnet placement locations around the inner wall. These magnet placement locations can be used to accommodate surface mounting magnets, as is described in more detail below in conjunction with FIGS. 9A and 9B.

In some embodiments, base 302 also includes a gap 306 formed into the solid ring structure of base 302 which connects the center of base 302 to the space outside base 302. The function and use of such a gap 306 is described in more detail below. Although not explicitly shown, each magnet placement location 304 can accommodate a magnet. A proposed magnetic device 300 is formed when magnets are properly installed into the magnet placement location 304.

Figure 1:
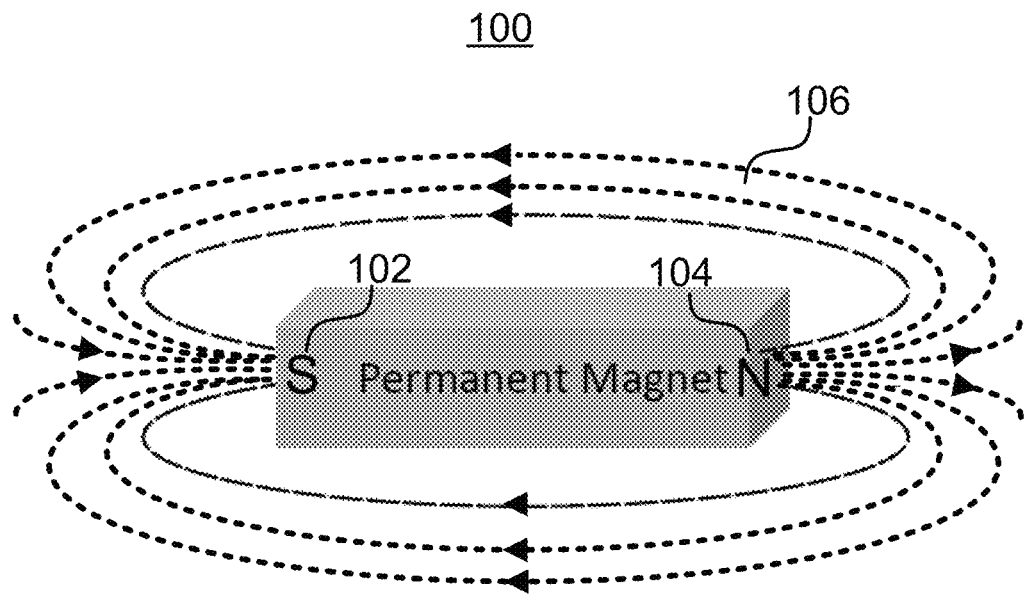
FIG. 1 illustrates a conventional bar magnet having two poles.
Figure 2:
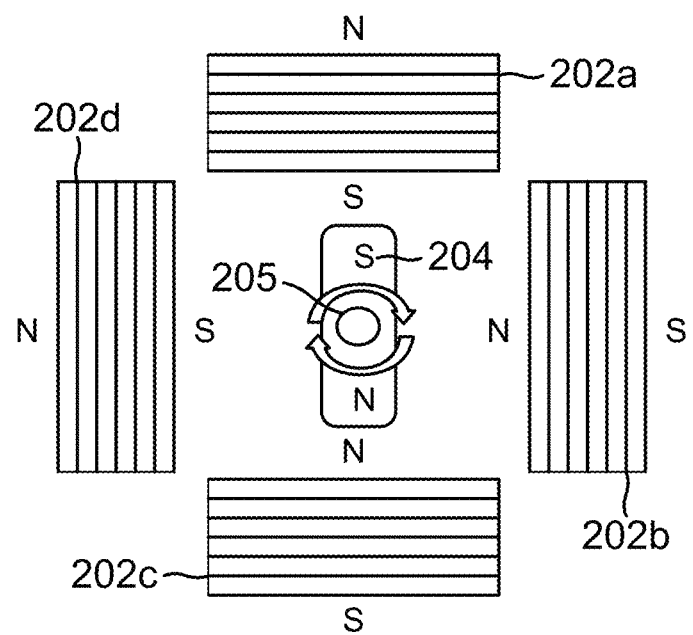
FIG. 2 presents a block diagram illustrating multiple magnets forming a stator ring, and a rotator magnet positioned in the middle of the stator ring.
Figure 4B:
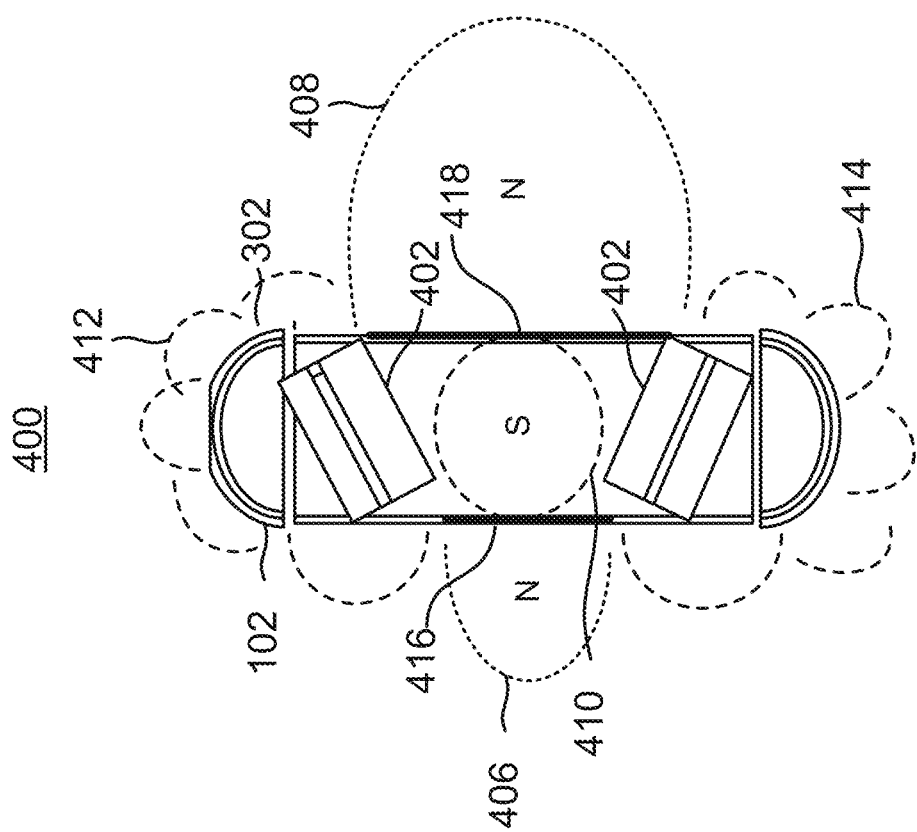
FIG. 4B illustrates exemplary field patterns actually generated by the magnet configuration of the device vs. the expected field patterns shown in FIG. 4A.
Figure 4A:
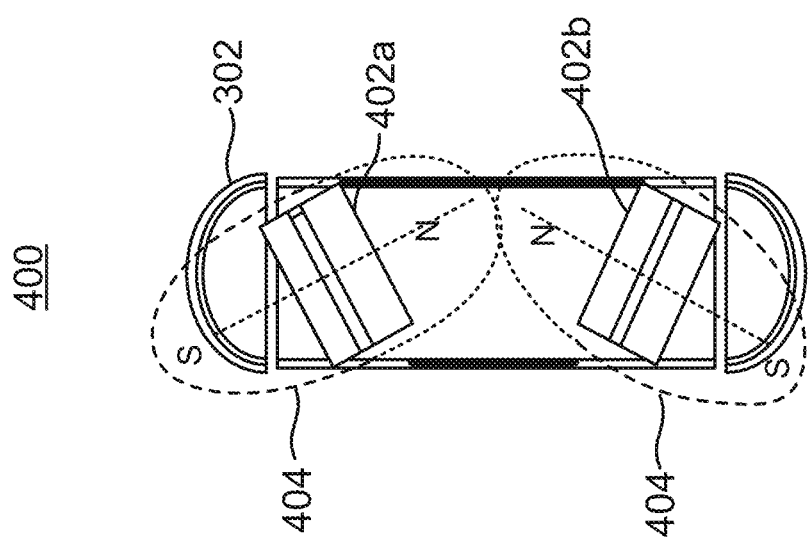
FIG. 4A illustrates a magnetic device with a set of magnets installed in the magnet placement locations of the base described in FIG. 3, and field patterns that would be expected to be produced given the field patterns shown in FIG. 1.

FIG. 4A illustrates a magnetic device 400 with a set of magnets 402 (i.e., 402*a* and 402*b*) installed in the magnet placement locations 304 of base 302 described in FIG. 3, and field patterns that would be expected to be produced given the field patterns shown in FIG. 1. Notably, in the exemplary device 400, the north pole of each magnet 402 faces the center of base 302 and is positioned closer to the upper surface of the base 302, while the south pole of each magnet 402 faces away from the center based 302 and is positioned closer to the lower surface of base 302. As such, each of the magnets 402 is placed such that an axis of the magnet (shown as the dotted straight lines passing through the magnets 402) connecting the north pole and the south pole of the magnet forms an angle with respect to the upper and lower surfaces. In various embodiments, the angle formed between the axis of the magnet connecting the north pole and the south pole and the upper and lower surfaces is between 0 and 90 degrees. In various embodiments, the set of magnets can include two, three, or more individual permanent magnets. In some embodiments, the set of magnets forms a continuous magnetic structure around the inner wall.

In the device configuration shown in FIG. 4A, it would be expected that the magnets would generate magnetic fields 404 with poles as shown, i.e., a combined north pole formed in the middle of device 400 and two south poles formed at the opposite ends of device 400. However, the field pattern shown in FIG. 4A is not what is actually produced by device 400 based on the described configuration.

FIG. 4B illustrates exemplary field patterns actually generated by the magnet configuration of device 400. More specifically, FIG. 4B represents a cross-sectional view of device 400, such that the right vertical edge of device 400 corresponds to the upper surface 307 of base 302 shown in FIG. 3, while the left vertical edge of device 400 corresponds to the lower surface 305 of base 302 shown in FIG. 3. As can be seen in FIG. 4B, three primary magnetic fields, 406, 408, and 410 are produced. More specifically, the first primary field 410 having a polarity of magnetic south, instead of magnetic north, is formed substantially in the middle of base 302. In the example shown, field 410 is located substantially within the open space surrounded by the upper opening in the upper surface, the lower opening in the lower surface, and the inner wall of based 302.

Also shown in FIG. 4B, a second primary field 408 having a polarity of magnetic north is formed outward from the upper, i.e., the larger opening of the base 302, and a third primary field 406 having a polarity also of magnetic north is formed outward from the lower or the smaller opening of the base 302 and on the opposite side of the primary field 410.

In some embodiments, a boundary between the first primary field 410 and the second primary field 408 is in the vicinity of the larger opening of the base 302 (shown as the dark vertical line on the right), and a boundary between the first primary field 410 and the third primary field 406 is in the vicinity of the smaller opening of the ring-shaped base 302 (shown as the dark vertical line on the left). Also note that, because opening 308 is greater in size than opening 310 (also indicated by the two dark lines 416 and 418 in FIG. 4B), the region of magnetic influence of the second magnetic field 408 may be significantly larger than the region of magnetic influence of the third magnetic field 406. In some embodiments, the openings 308 and 310 of base 302 can be configured to desired sizes and geometries for controlling the region of magnetic influence of each of the second magnetic field 408 and the third magnetic field 406.

While the exemplary device 400 is configured to form one magnetic south pole between two magnetic north poles, alternative designs of device 400 can install the magnets in reverse of the configuration shown in FIG. 4B. In such designs, three primary magnetic fields, 406', 408', and 410' are produced such that the first primary field 410' of magnetic north is formed substantially in the middle of the base 302 while the second primary field 408' and the third primary field 406 of magnetic south are formed on either side of the first primary field 410.

Also shown in FIG. 4B, there can be some additional field effects 412 and 414 in additional to the three primary fields 406-410. However, for purposes of the discussion herein, the fields generated by device 400 can be approximated by the three primary fields described above. FIG. 5 illustrates an approximated field pattern 500 of the magnetic device 400 comprising the three primary fields 406-410 in accordance with some embodiments described herein. As shown in FIG. 5, the field pattern 500 generated by device 400 includes two north poles located on both sides and one south pole located in between the two north poles. The field characteristics of the disclosed device 400 can be used in various applications to achieve various benefits, e.g., when used in an electric motor, to improve the efficiency of the electric motor.

As described above in conjunction with FIG. 3, base 302 of devices 300 or 400 can also include a gap 306 within the base 302. Such a gap can be used in exemplary applications to accelerate another magnet. FIG. 6 illustrates an exemplary process of accelerating a device 600 comprising a magnet 602 attached to a rod 604 or other stabilizing apparatus through a magnetic field 606 formed by multiple field patterns 500 shown in FIG. 5 in accordance with some embodiments described herein.

More specifically, magnetic field 606 comprises an array of field patterns 500a and 500b, each of which is generated by an instance of the device 400 in FIGS. 4A and 4B comprising a based 302 and a set of magnets 402. Note that, the array of devices 400 that generates magnetic field 606 can be placed in series, or linked with one another. While only two field patterns 500a and 500b are shown, much more than two instances of device 400 can be put together to form a longer array of device 400 generating a corresponding longer array of field patterns 500 to accelerate magnet 600 over a longer distance. For example, this longer array of device 400 can be configured in a circular pattern as shown in the inset of FIG. 6, which includes seven instances of field pattern 500. In this example, the magnet 602 can be accelerated/propelled in a circular motion around the circular path 608. In another example, multiple field patterns 500 can be configured in a linear fashion to accelerate/propel the magnet 602 in a straight line path (not shown). In all these examples, when the magnet 602 travels through the array of field patterns 500, the relatively narrow rod 604 can pass through each gap 306 of each base 302 of each instance of device 400, while the wider magnet 602 passes through the opening of each base 302 in the middle of base 302.

We now look at how the magnet 602 accelerates through field 606 in more detail. As can be seen in FIG. 6, when the magnet 602 is initially positioned on the left of field pattern 500a, the south pole of magnet 602 will be attracted to the north pole of field 506a of field pattern 500a. This interaction can cause device 600 to accelerate to the right in FIG. 6. As magnet 602 enters field 506a, field 506a begins to repel the north pole of magnet 602, causing further acceleration of magnet 602 to the right. If the magnet 602 is initially accelerated enough to overcome the repelling effect of the south pole, i.e., field 510a of field pattern 500a on the south pole of magnet 602, then field 510a will start to repel the south pole of magnet 602 while continues to attract the north pole of magnet 602. Meanwhile, the second north pole, i.e., field 508a of field pattern 500a begins to attract the south pole of magnet 602. Once magnet 602 enters field 508a, field 508a will start to repel the north pole of magnet 602 so that magnet 602 continues to accelerate to the right to exit field pattern 500a.

Thus, the interaction between the three primary fields in field pattern 500a and the poles of magnet 602 can cause device 600 to move from left to right in FIG. 6. As described above, the gap 306 in base 302 can be configured to accommodate rod 604 allowing device 600 to move without obstruction through the first instance of device 400 that generates field pattern 500a. Next, a second instance of device 400, represented by field pattern 500b that is placed in series with, or linked with the first instant of device 400, continues the process. Multiple instances of device 400 can be linked in various configurations including, but are not limited to, a circle or a linear array as described below.

Figure 7A:
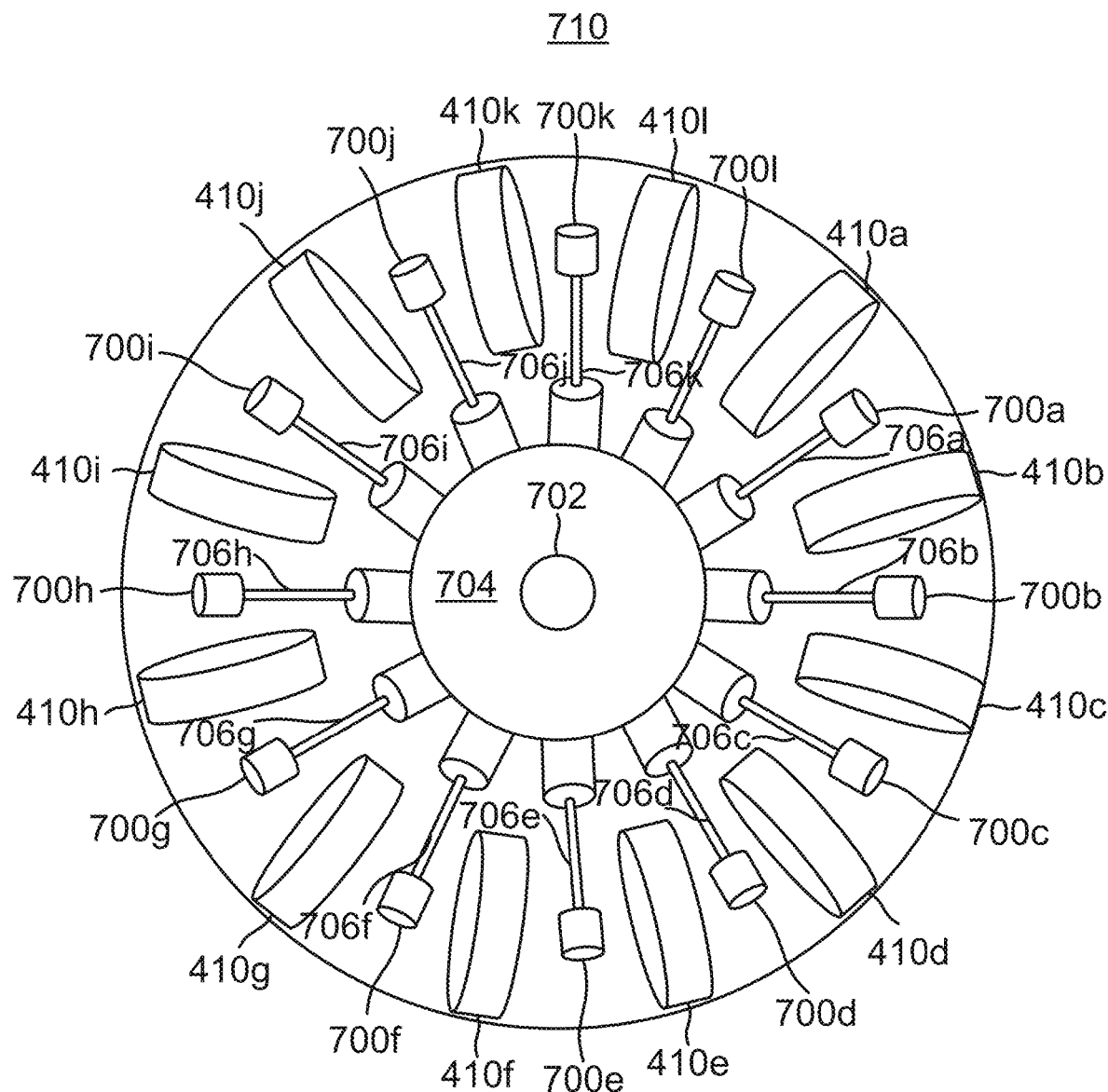
FIG. 7A illustrates a magnetic rotor-stator device that includes a circular array of magnetic field generating devices configured as stators to drive a rotor wheel around a shaft that includes a circular array of magnets attached to the rotor wheel through a set of rods in accordance with some embodiments described herein.

FIG. 7A illustrates a magnetic rotor-stator device 710 that includes a circular array of magnetic field generating devices 410*a*-410*l* configured as stators to drive a rotor wheel 704 around a shaft 702 that includes a circular array of magnets 700*a*-700*l* attached to the rotor wheel 704 through a set of rods 706*a*-706*l* in accordance with some embodiments described herein. While magnetic rotor-stator device 710 includes many more instances of magnetic field generating device 400 and many more magnets 700 than the exemplary system shown in FIG. 6, the driving mechanism is essential the same as the process described above in conjunction with FIG. 6. While the rotor wheel 704 is rotating, each narrow rod 706 can pass through each gap 306 (not shown) of each base 302 of each device 410, while each magnet 700 passes through the opening of each base 302 in the middle of each base 302.

Figure 7B:
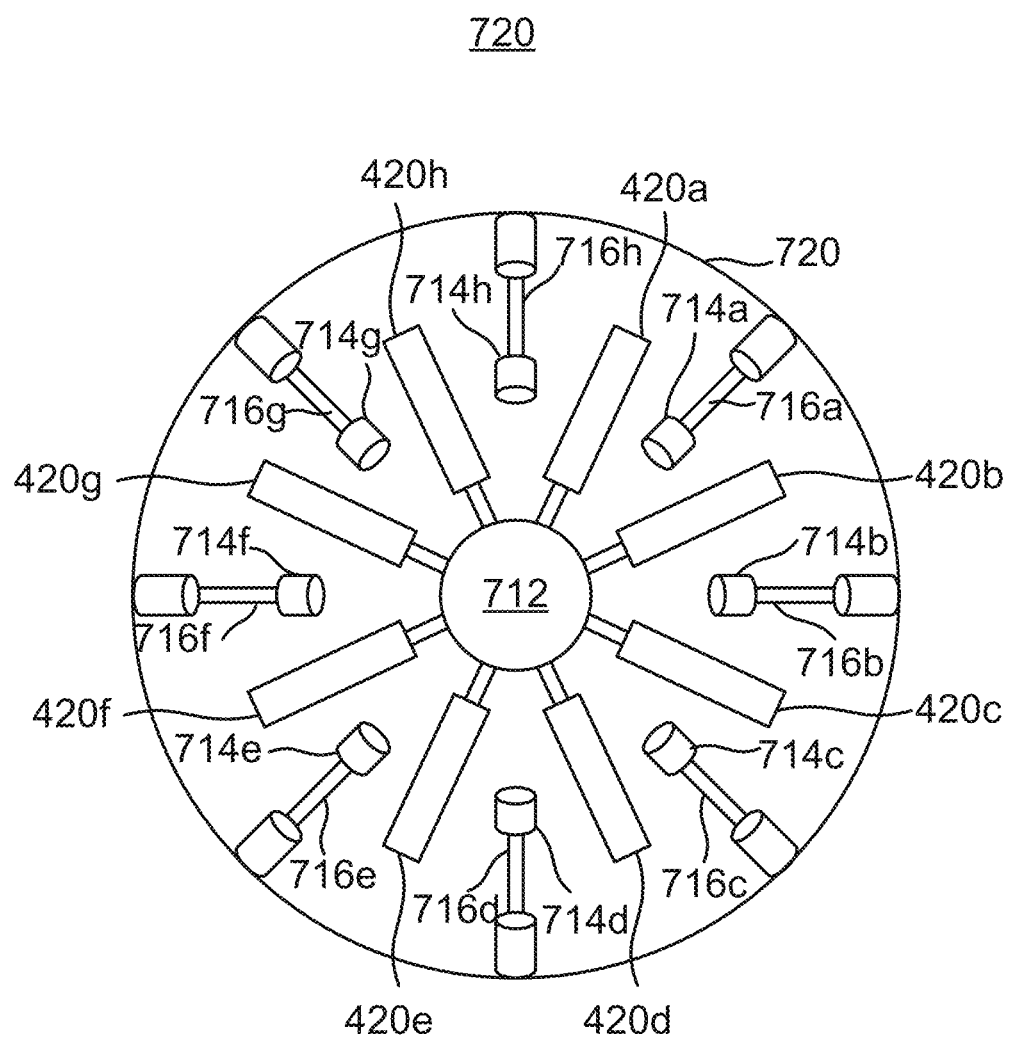
FIG. 7B illustrates an alternative magnetic rotor-stator device that includes a circular array of magnetic field generating devices attached to a center shaft acting as the rotor and a set of magnets attached to the outside of the rotor-stator device through a corresponding set of rods and acting as the stator in accordance with some embodiments described herein.

FIG. 7B illustrates an alternative magnetic rotor-stator device 720 that includes a circular array of magnetic field generating devices 420*a*-420*h* attached to a center shaft 712 acting as the rotor while a set of magnets 714*a*-714*h* attached to the outside of rotor-stator device 720 through a corresponding set of rods 716*a*-716*h* and act as the stator in accordance with some embodiments described herein.

Figure 7C:
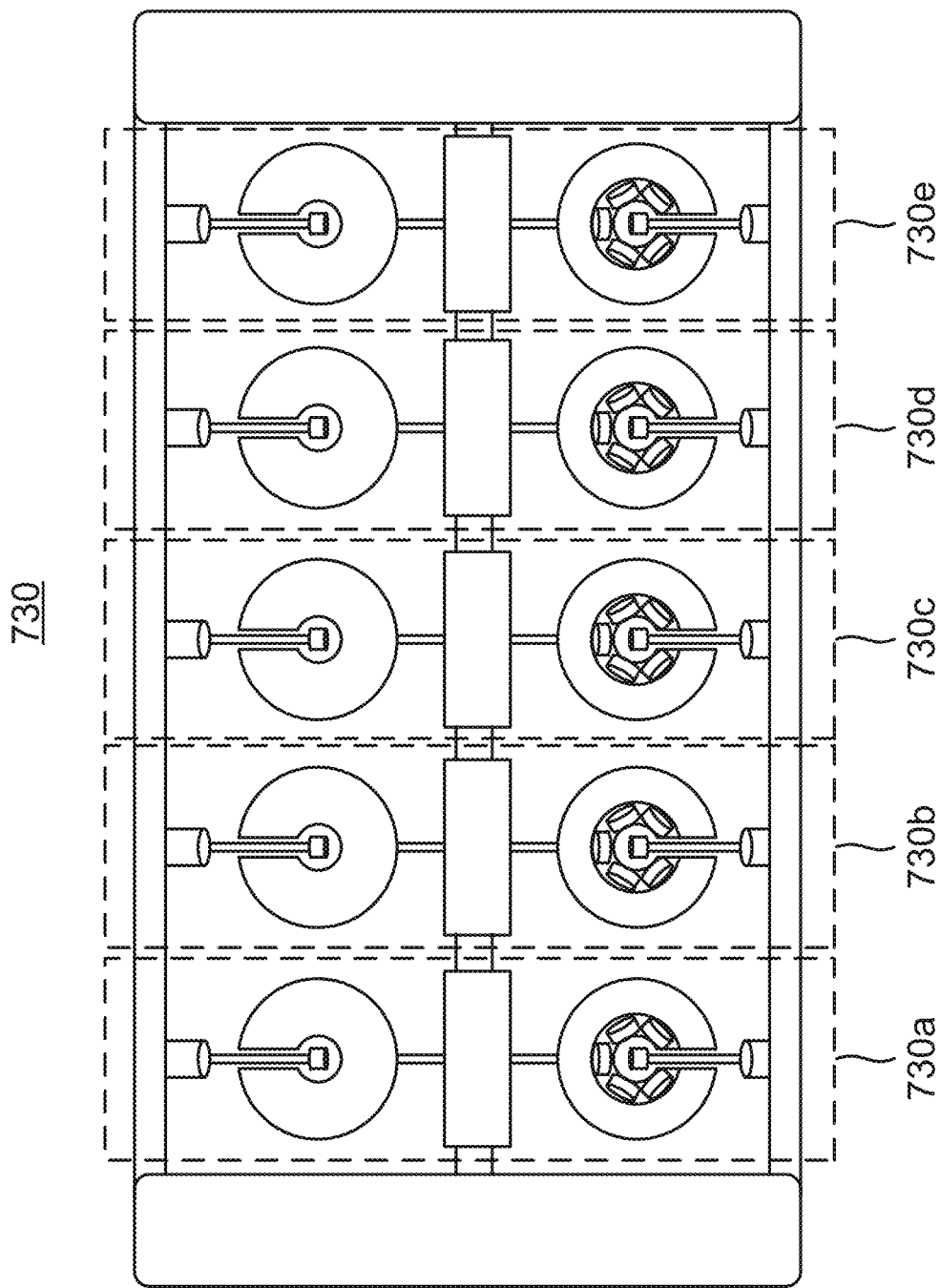
FIG. 7C illustrates another example of a magnetic rotor-stator device based on the magnetic rotor-stator device described in FIG. 7B.

FIG. 7C illustrates another example of magnetic rotor-stator device 730 based on the magnetic rotor-stator device 720 described in FIG. 7B. As can be seen in FIG. 7C, magnetic rotor-stator device 730 includes a set of identical subsections 730*a* to 730*e*, and each of the subsections 730 is constructed in a matter similar to the magnetic rotor-stator device 720 described in FIG. 7B.

In some embodiments, if magnet 602 in FIG. 6 is an electromagnet, then the polarity of magnet 602 can be advantageously switched or turned off to aid the operation described above. This is illustrated in conjunction with FIGS. 8A-8H, which describes a process of moving an electromagnetic device 800 from left to right through an array of field patterns 500*a*-500*c* of three instances of devices 400 while switching the polarities of device 800.

Figure 8A:
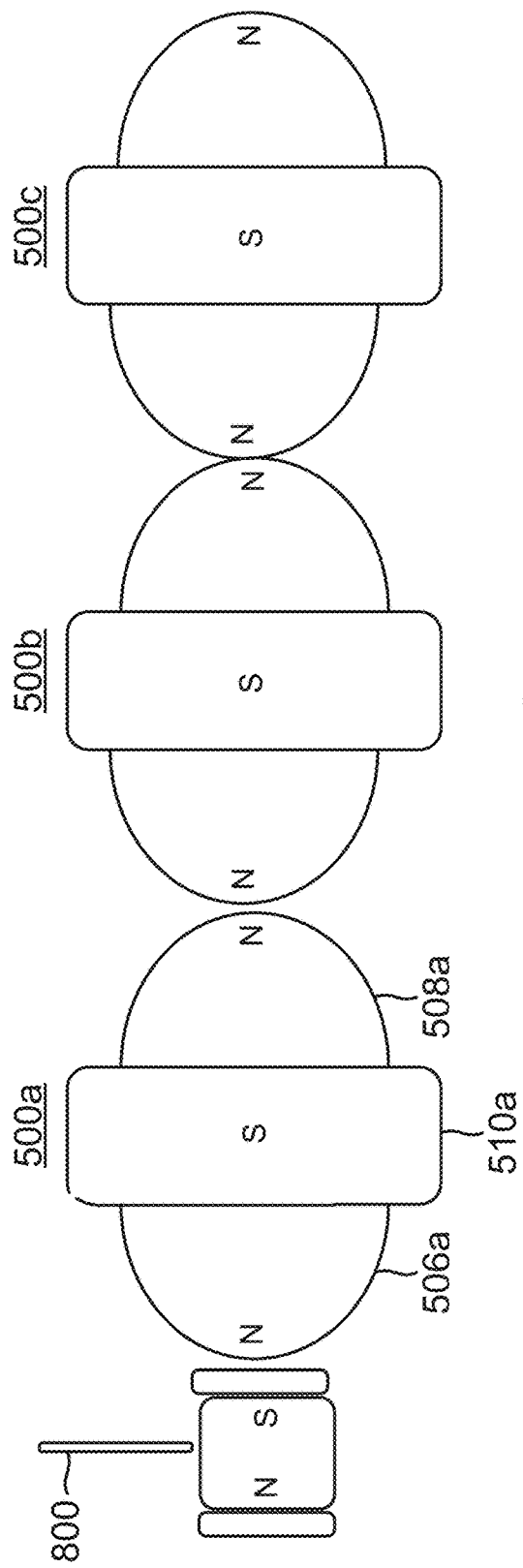
Figure 8B:
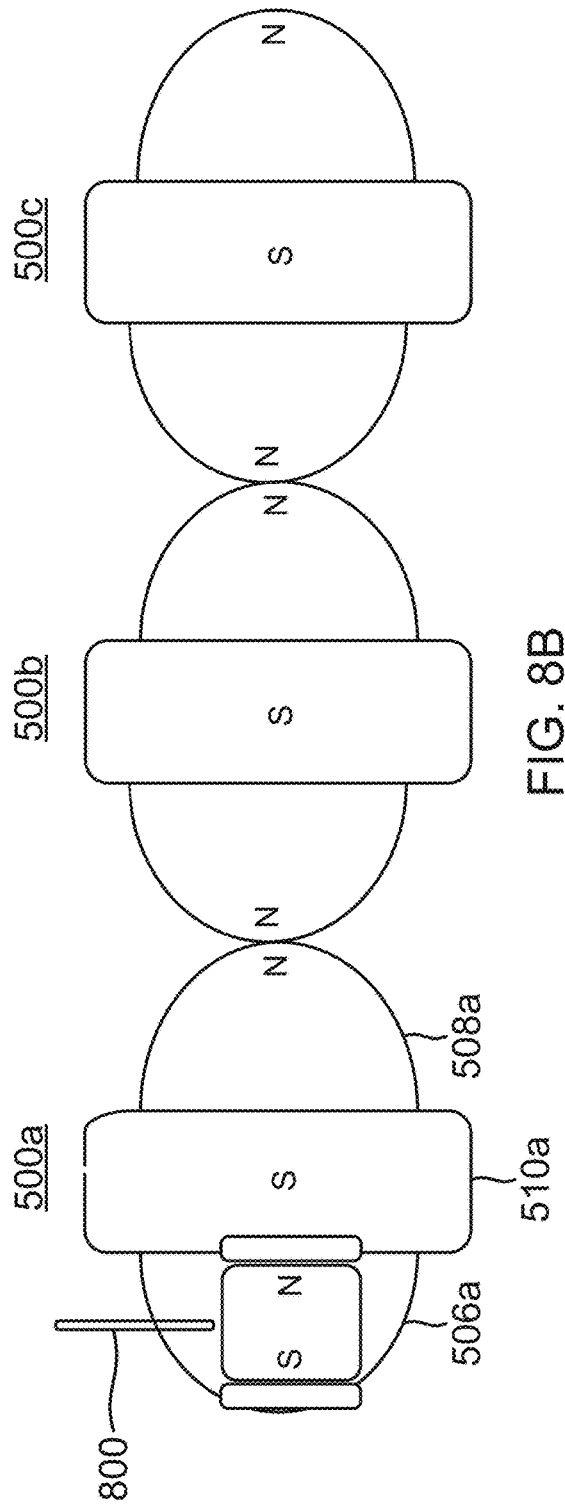

FIG. 8A illustrates the initial position of the electromagnetic device 800 before entering the first north pole of field pattern 500*a*. As can be seen in FIG. 8A, device 800 can have the magnetic polarity orientation of north-south as illustrated such that it will move left to right under the influence of field pattern 500*a* as described above. FIG. 8B illustrates electromagnetic device 800 completely enters north pole field 506*a* after being attracted by the first north pole of field pattern 500*a*. More specifically, in FIG. 8B, the polarity of device 800 has just switched from the initial north-south to south-north to facilitate the device 800 to easily move into and across the south pole in the middle of field pattern 500*a*. This first switch operation may be useful when the north pole of field pattern 500*a* does not provide enough momentum to overcome the repellant force from the south pole of field pattern 500*a*.

FIG. 8C illustrates electromagnetic device 800 has moved from field 506*a* into south pole field 510*a* in the middle of field pattern 500*a* under the attraction force of the south pole, while FIG. 8D illustrates electromagnetic device 800 has completely entered field 510*a* and the polarities of device 800 remain the same.

Figure 8E:
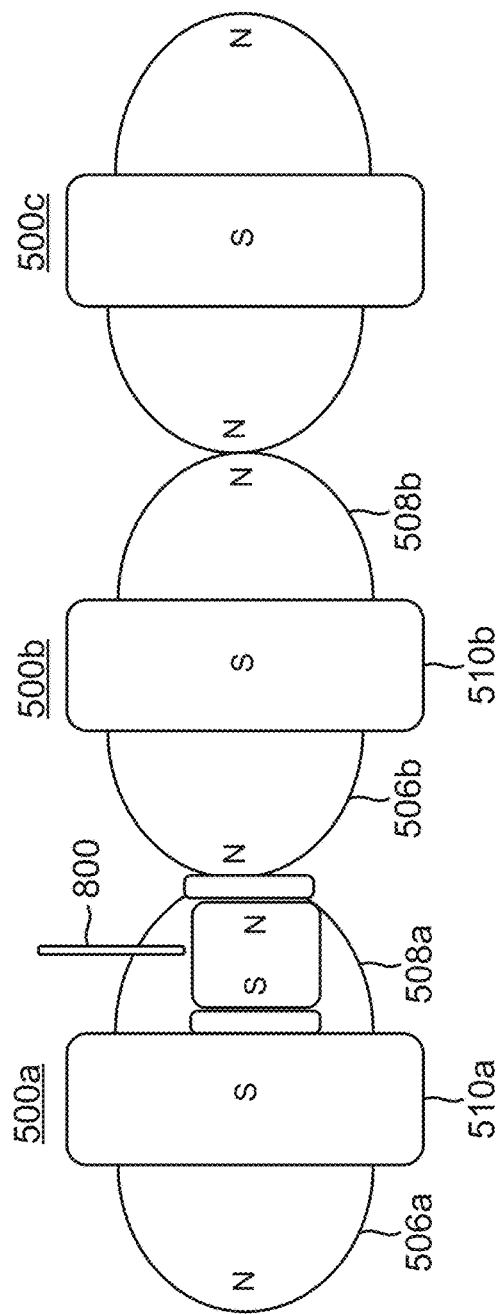
FIG. 8E illustrates the electromagnetic device has entered the second north pole field 508*a* in field pattern 500*a* and the polarities of device 800 remain the same.

FIG. 8E illustrates electromagnetic device 800 has entered the second north pole field 508*a* in field pattern 500*a* and the polarities of device 800 remain the same. Note that, as device 800 exits the south pole field 510*a* and enters north pole field 508*a*, there is a point at which the north pole field 506*b* of the next field pattern 500*b* has not started pushing back on device 800. In one embodiment, this is the point at which the north pole of device 800 remains interacting with the north pole field 506*a* of field pattern 500*a*. This can be a desired point of time to switch the polarities of device 800 from south-north back to north-south or turn off the electromagnetic all together and allow it to coast.

Figure 8F:
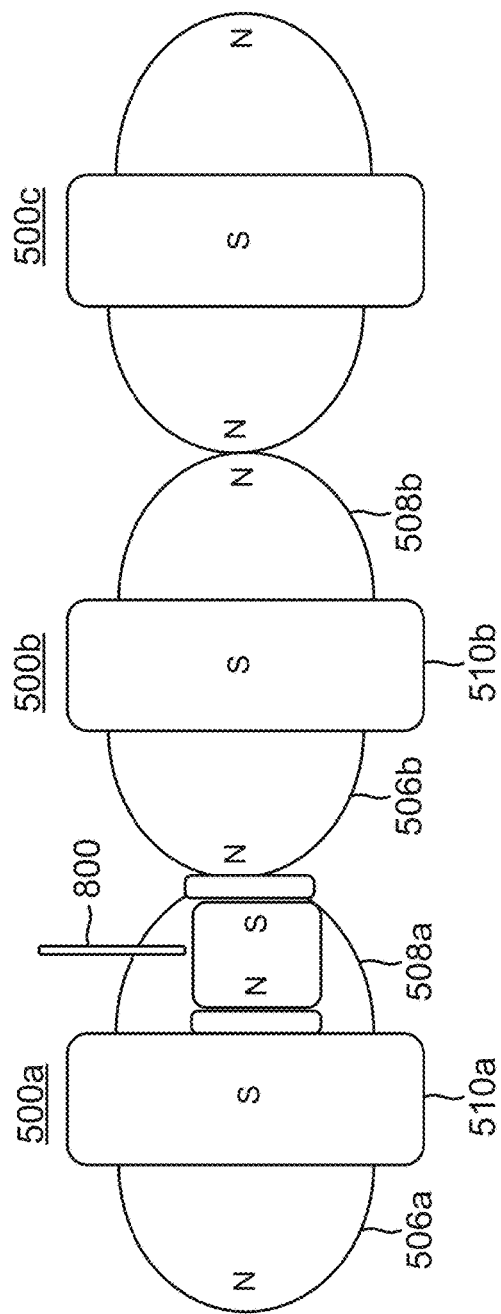
FIG. 8F illustrates the electromagnetic device has again switched polarities from south-north back to north-south.

FIG. 8F illustrates electromagnetic device 800 has again switched polarities from south-north back to north-south, and as a result, the north pole field 508*a* of field pattern 500*a* will repel the north pole of device 800 and the north pole field 506*b* of field pattern 500*b* will attract the south pole of device 800. As can be seen, this condition is similar to the initial condition illustrated in FIG. 8A which leads device 800 to move into field 506*b* of field pattern 500*b*, as is illustrated in FIG. 8G, and the above described process can repeat. As can be seen in FIG. 8H, the polarities of device 800 has switched again from north-south back to south-north to facilitate device 800 to move across the second south pole field 510*b* of field pattern 500*b*.

Comparing to the non-switching process described in conjunction with FIG. 6, the switching operation in combination with turning the electromagnets off described above can make the operation much more efficient. In various embodiments, the spacing between adjacent instances of devices 400 and the timing of the switching play an important role in the operation and the amount of improvement in operation efficiency.

In an alternative embodiment to the process described above, instead of switching the polarities of the electromagnet 800, the magnetism may be briefly switched off at some points in the process to facilitate the electromagnetic device 800 to move from poles to poles. For example, in FIG. 8B, instead of switching, the magnetism of electromagnetic device 800 may be briefly turned off to allow the momentum to carry electromagnetic device 800 into south pole field 510*a*. After the electromagnetic device has completely entered the south pole, the magnetism can then to turned back on to active the attraction force between the south pole of electromagnetic device 800 and the north pole field 508*a* and the repel force between the south pole of electromagnetic device 800 and the south pole field 510*a* so that electromagnetic device 800 moves into the second north pole field 508*a* efficiently. In some other embodiments, switching of polarities and turning on and off the magnetism can be combined into the same operation.

It should also be noted that in certain embodiments, the magnet-rod devices can actually be in a fixed position and magnetic field generating devices can be configured to allow them to move right to left under the same principles of interaction between the fields.

Figure 9B:
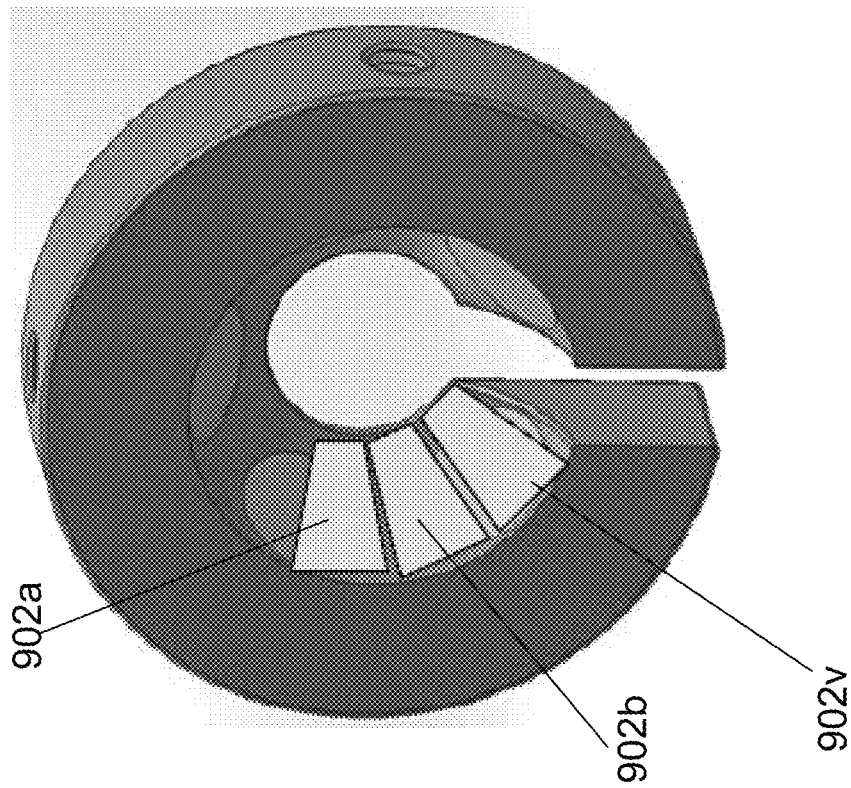
FIG. 9B illustrates an alternative magnetic field generating device which uses surface mounting magnets in accordance with some embodiments described herein.
Figure 9A:
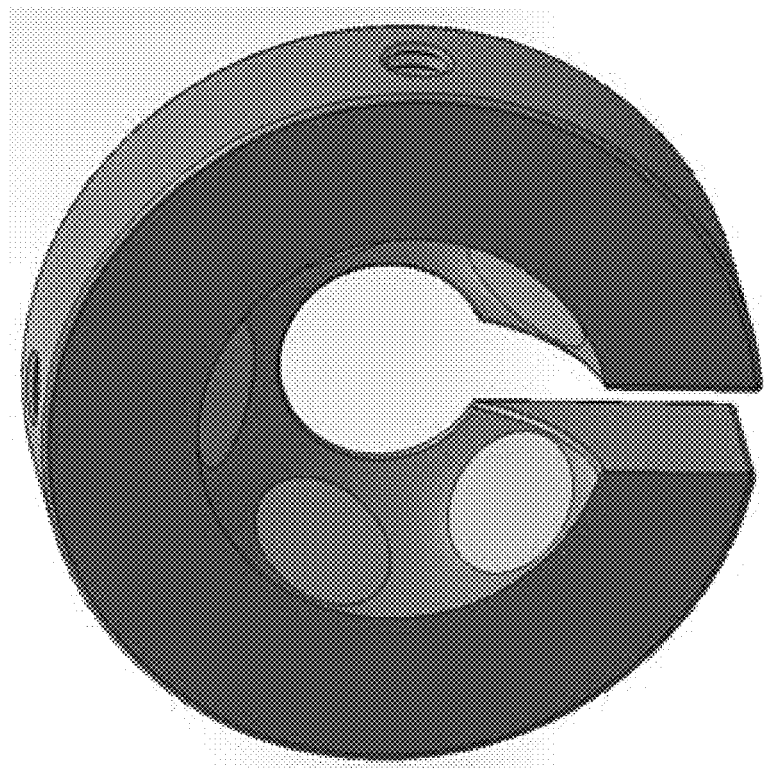
FIG. 9A illustrates an exemplary embodiment of the proposed magnetic field generating device that includes a base having a parabolic shaped inner wall and a set of magnets installed inside a corresponding set of magnet placement locations within the inner wall.

FIG. 9A illustrates a device 900A which is an exemplary embodiment of device 300 or device 400 that includes a base having a parabolic shaped or an angled inner wall and a set of magnets installed inside a corresponding set of magnet placement locations within the inner wall.

FIG. 9B illustrates an alternative magnetic field generating device 900B which uses surface mounting magnets in accordance with some embodiments described herein. As can be seen in FIG. 9B, device 900B includes a base substantially identical to the base of device 900B. However, instead of using magnets which are installed into the recesses as in device 900A, device 900B uses a set of surface mount magnets 902 attached directly to the surface of the inner wall of device 900B. Notably, each of these magnets takes on the parabolic shape of the inner wall. In some embodiments, each of the magnets 902 has a trapezoid geometry to facilitate achieving a maximum coverage of the inner wall. This increased coverage of the inner wall enables generating a desired three-field magnetic field pattern having a stronger intensity.

Referring back to FIG. 4B, another important aspect or property of device 400 as illustrated in FIG. 4B is related to the interface of the north poles 406 and 408 with south pole 410. Note that these two interfaces, located approximately at the two openings indicated by the two dark lines 416 and 418, are the locations where the magnetic field changes polarities. As a result of the device 400 having these openings, these interfaces or transition boundaries between north poles and south pole become accessible to objects. In contrast, these locations are not accessible in permanent magnets such as bar magnet 100 in FIG. 1 because they are located inside the magnet itself.

The configuration of device 400 is such that, if another magnet is inserted between north pole 406 and south pole 410, or between north pole 408 and south pole 410 that is smaller than openings 416 and 418 respectively, then the magnet will "register" right at the interface of the poles and hover over or "be suspended at" the opening 416 or 418. Notably, this property is not affected by the orientation of device 400, whether device 400 is placed vertically or horizontally. If a pressure is applied to the hovering magnet and then released, the magnet will incline to return to substantially the same location. Thus, the combination of such a magnet and the device 400 can be used to create a force measuring transducer. Moreover, this combination device can also be used to create other types of transducers, valves, speakers, microphones, pumps, among others. Also note that, when the polarities of this combination device are suddenly reserved, the registered magnet will flip inside the space where it suspends at. This additional property can be utilized to make motors, fans, flow devices, and other devices which can take advantage of this property.

FIG. 10A shows a cross-sectional view of another example of the proposed magnetic device 1000 which includes two openings and the associated field pattern with three poles in accordance with some embodiments described herein. In this figure, the two transition boundaries are indicated as "position 1" and "position 2," respectively. FIG. 10B shows a perspective view of magnetic device 1000 having the two transition boundaries at the two openings in accordance with some embodiments described herein.

Figure 10C:
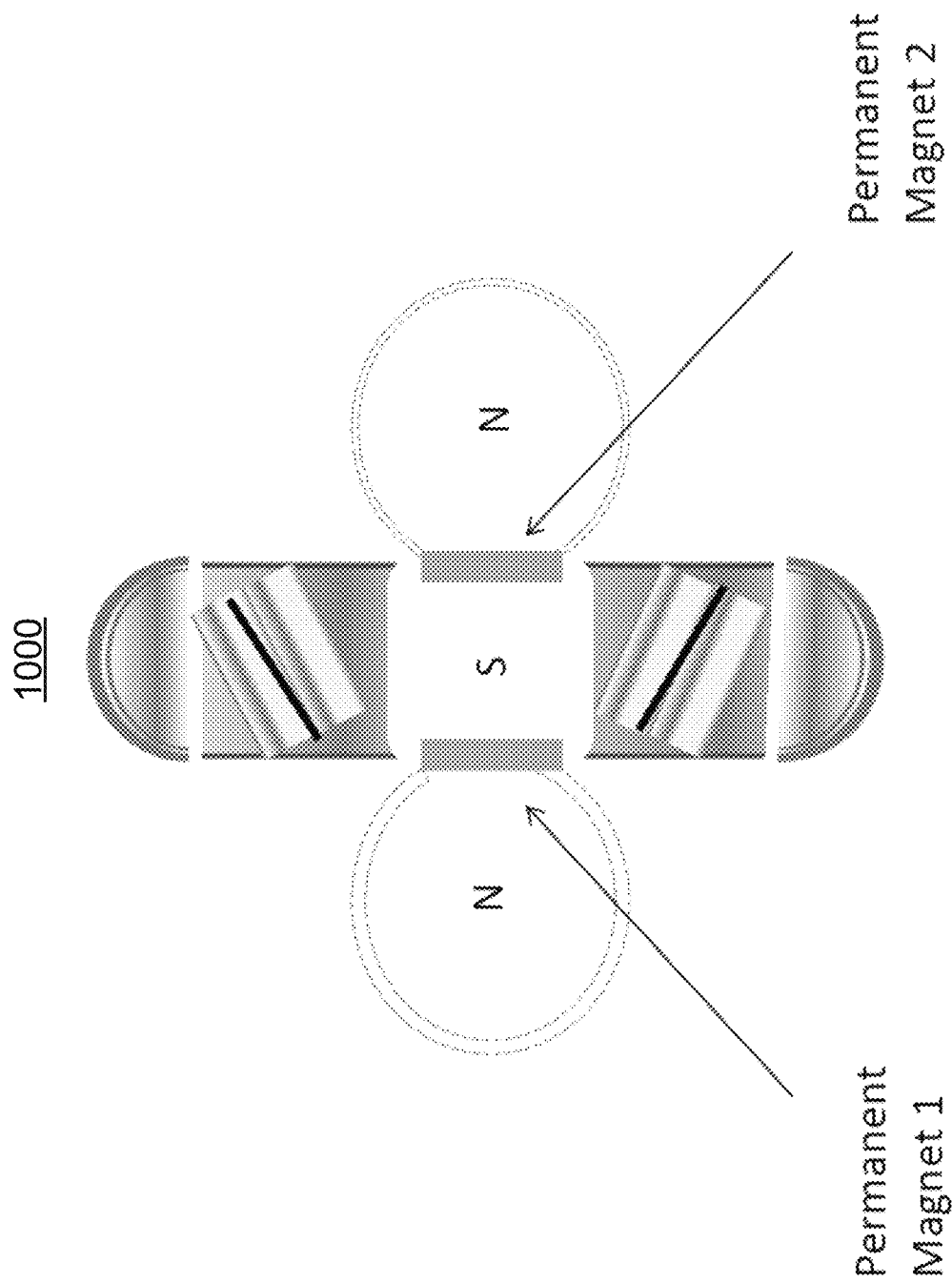
FIG. 10C shows magnetic suspension using the magnetic device 1000 where two permanent magnets 1 and 2 are suspended at the two transition boundaries—position 1 and position 2 in accordance with some embodiments described herein.

FIG. 10C shows magnetic suspension using the magnetic device 1000 where two permanent magnets 1 and 2 are suspended at the two transition boundaries—position 1 and position 2 with perfect fidelity in accordance with some embodiments described herein. Notably, while magnetic device 1000 in FIG. 10B shows a gap, other embodiments of magnetic device 1000 do not need to have a gap when the device is used to suspend a permanent magnet as described above.

In addition to the exemplary devices and systems described above, numerous other devices and machines can be designed that take advantage of the field properties of the proposed magnetic device such as device 400. For example, an efficient fly wheel can be designed for storing kinetic energy or device 400 can also be used as a fan blade to cool electromagnetic components.

For example, certain embodiments described herein provide propulsion to, e.g., aircraft, drones and other flying devices that use electrical current as the source of power. Conventionally, electric motors that drive propellers or fan blades sit either behind or in front of the propeller or fan blades. As such, the electric motor itself actually blocks air flow into the propeller or fan blades. In addition, the thrust to weight ratio and lack of redundancy are issues with conventional designs.

But by integrating the electric motor with the fan blades, as described below, there is no blockage of air flow, the electric motors can be designed to be redundant, and there is no central shaft, gears or belts driving the fan blades further reducing weight and improving thrust to weight ratios. Further, such configurations allows for multiple motors to be connected in serial and run at different revolutions per minute to achieve the desired efficiency and thrust.

As stated above, the embodiments described herein can provide propulsion to aircraft, drones, or other flying devices that use electrical current as the source of power. As a result, these embodiments can address several problems associated with electric powered aircraft, drones, or other flying devices including among others, redundancy, weight, efficiency, thrust, manufacturing cost, maintenance and size. By integrating the electrical motor and the fan blades into a single component, efficiencies are gained over conventional electrical aircraft motor designs including weight to thrust ratios, ease of maintenance, redundancy, and cost of manufacturing.

Using electrical current produced by a generator, battery, solar panel, fuel cell or any combination of the previous mentioned sources of electrical current, the electric aircraft motor described herein converts this energy into mechanical thrust that is used by the aircraft, drone, or other flying device to achieve flight. Similar embodiments can provide propulsion for water craft, either submersible or non-submersible.

By integrating the electric motor with the fan blades, there is no blockage of air flow, the electric motors can be designed to be redundant, and there is no shaft, gears, or belts driving the fan blades thereby reducing weight.

Certain Embodiments Discussed Here Include the following components: 1. Fan Blade Housing 1101; 2. Fan Blades 1102; 3. Fan Blade Housing Bearings 1103; 4. Fan Blade Housing Cowling 1104; 5. Permanent Magnet Mounts 1105; 6. magnetic devices 1106; 7. Serially Connected Fan Blade Housings 1107; 8. Permanent Magnets 1108; 9. magnetic device Current Controller 1109.

Figure 11A:
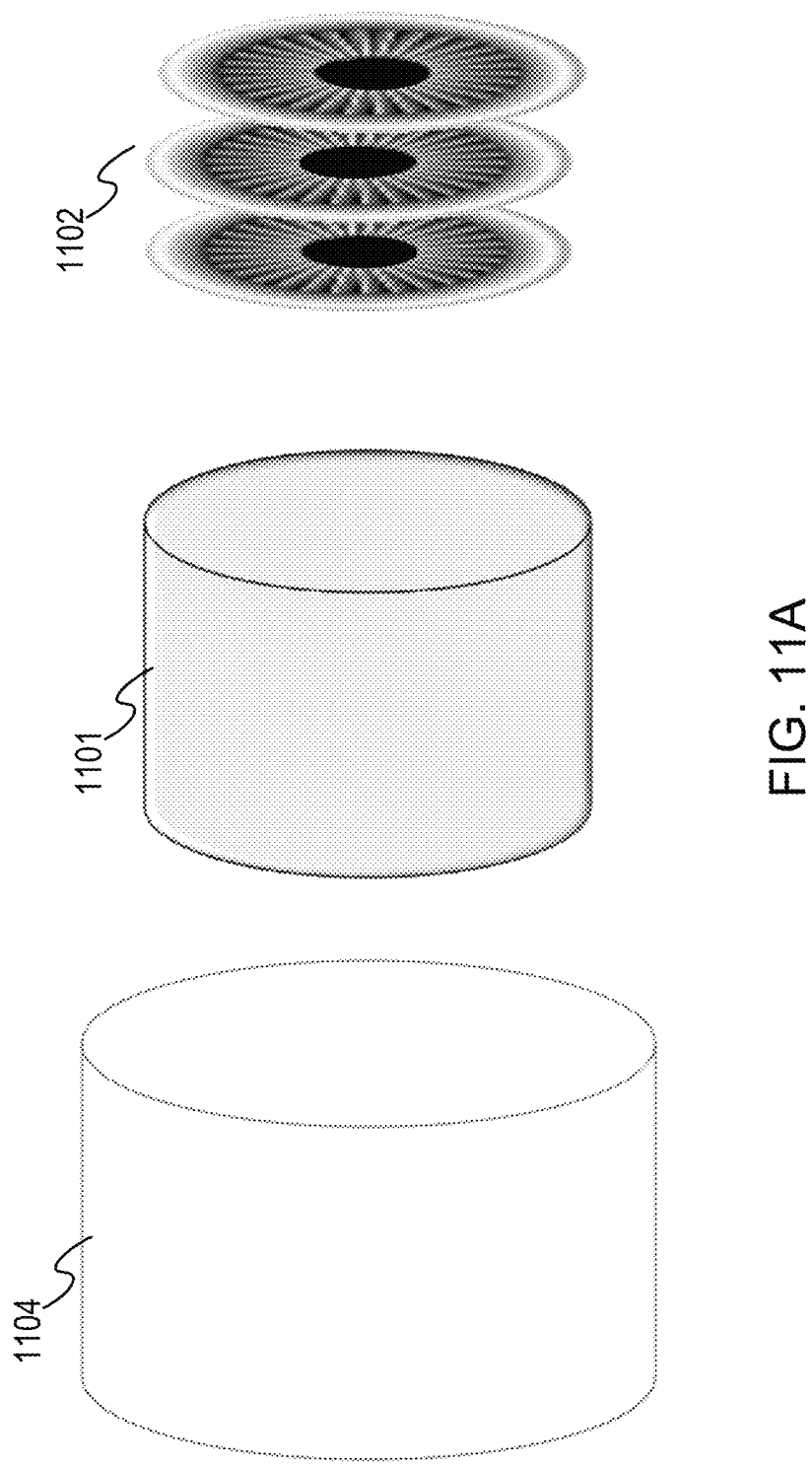
Figure 11E:
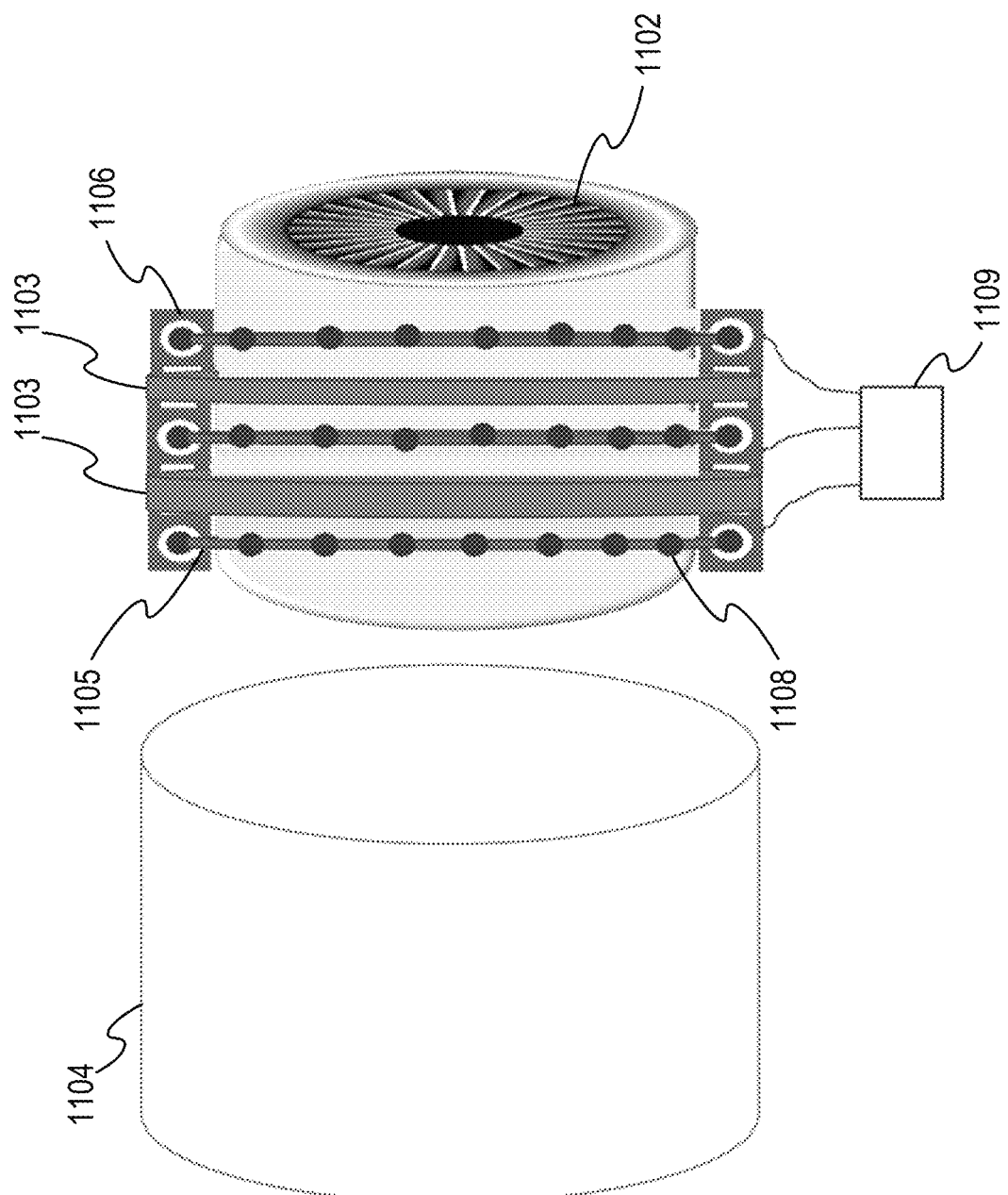
Figure 11F:
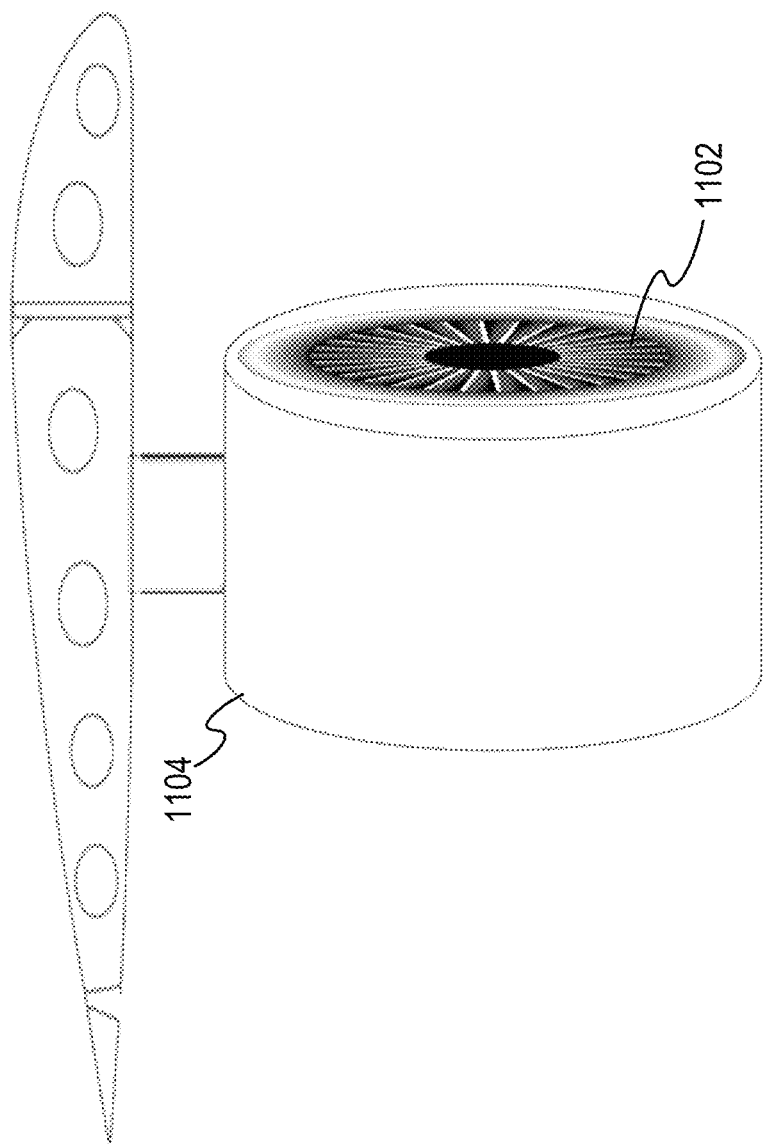

As illustrated in FIGS. 11A-G, such a fan or propulsion system can be constructed in the following fashion: The Fan Blades 1102 are inserted into the Fan Blade Housing 1101 and secured into place. It should be noted that the size and the number of blades can be varied to produce the desired thrust. See FIGS. 11A and B. The Fan Blade Housing 1101 is inserted into the Fan Blade Housing Bearings 1103 as illustrated in FIGS. 11C and D, which allows the Fan Blades 1102 to spin freely inside the bearings.

Permanent Magnet Mounts 1105 are then attached to the Fan Blade Housing 1101, Permanent Magnets 1108 are attached to the Permanent Magnet Mounts 1105, and the magnetic devices 1106 are attached to the Fan Blade Housing Bearings 1103. As described above, the magnetic devices 1106 can include an opening that allows the permanent magnets 1108 to pass through the magnetic devices 1106. The completed Fan Blade Housing 1101 is then inserted into the Fan Blade Housing Cowling 1104, which can then be attached to the vehicle.

It should also be noted that an magnetic device Current controller 1109 can be interfaced with the magnetic devices 1106.

Figure 11G:
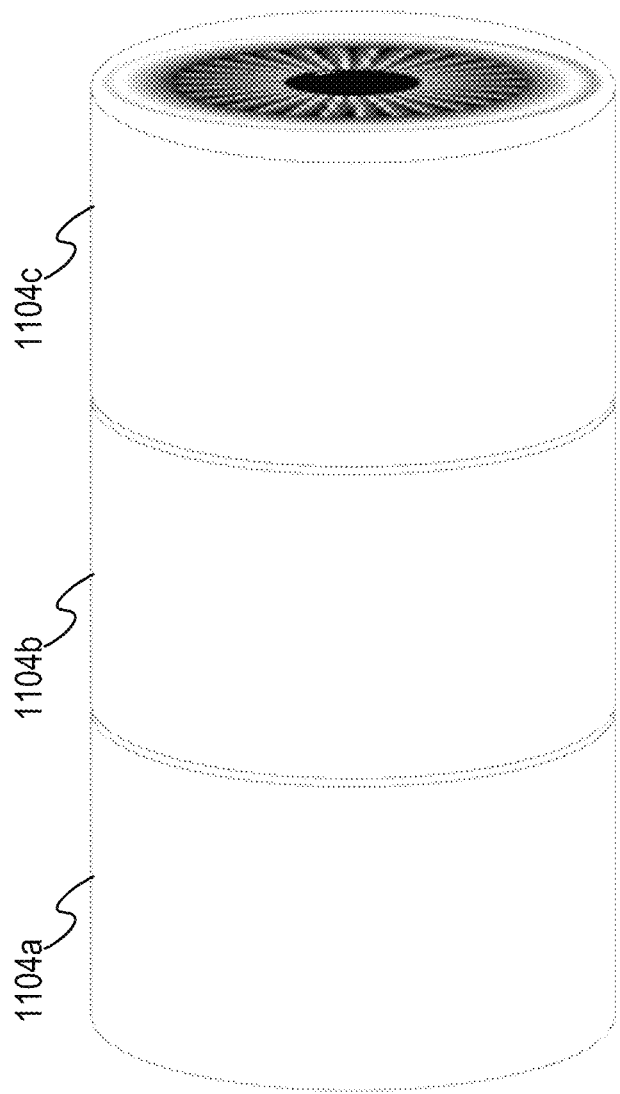

Once configured as described, Permanent Magnets 1108 interact with the magnetic devices 1106 controlled by the magnetic device Current Controller 1109, as described above, causing the Fan Blade Housing 1101 to spin. In other words, the magnetic devices 1106 will create magnetic fields that will propel the permanent magnets forward in the same direction, thereby causing the housing 1101 to which they are attached to spin. As housing 1101 spins the Fan Blades 1102 located inside the Fan Blade Housing 1101 cause air to be drawn in and pushed out the back generating thrust for the craft. To alter thrust or efficiency, multiple Fan Blade Housings 1101 can be connected together to create serially connected Fan Blade Housings as illustrated in FIG. 11G. Each Fan Blade Housing 1101 can spin independently and at different revolutions per minutes to achieve the desired thrust and efficiency.

Altering the number of Permanent Magnet Mounts 1105, Permanent Magnets 1108 or magnetic devices 1106 will either increase or decrease the power. Additional Fan Blade Housing Bearings 1103 can add increased stability to the spinning Fan Blade Housing 1101. Adding different sized or a different number of Fan Blades 1102 to the Fan Blade Housing 1101 will alter the flow of the air through the Fan Blade Housing 1101. Connecting multiple Fan Blade Housings 1101 together, as illustrated in FIG. 11G allows the individual Fan Blade Housings 1101 to spin independently and at different revolutions per minutes to achieve the desired thrust and efficiency. Using the magnetic device Current Controller 1109, the interaction between the Permanent Magnets 1108 and the magnetic devices 1106 can be altered to achieve desired thrust and efficiency.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A propulsion system, comprising:
   a fan blade housing;
   a plurality of fan blades within the fan blade housing;
   one or more rows of permanent magnets, affixed to the outside of the fan blade housing;
   one or more fan blade bearings;
   one or more magnetic devices affixed to the one or more fan blade bearings and corresponding to the one or more rows of permanent magnets, the magnetic devices configured to cause the permanent magnets to be propelled forward in the same direction, thereby causing the fan blade housing to which they are attached, and the fan blades within, to spin; and
   wherein each of the one or more magnetic devices comprises:
      a base including an upper surface, a lower surface, and an inner wall and an outer wall that are sandwiched between the upper surface and the lower surface, wherein the upper surface includes a first opening defined by the upper edge of the inner wall, the lower surface includes a second opening defined by the lower edge of the inner wall; and
      a set of magnets placed to cover a portion of the inner wall, wherein each of the magnets is positioned such that an axis of the magnet connecting the north pole and the south pole of the magnet forms an angle with respect to the upper and lower surfaces.

2. The propulsion system of claim 1, wherein the set of magnets are placed inside a set of recessed locations within the inner wall of the base.

3. The propulsion system of claim 1, wherein the set of magnets are mounted on the surface of the inner wall of the base.

4. The propulsion system of claim 1, wherein each of the set of magnets located in or around the inner wall has a trapezoid, circular, square, and/or triangular geometry.

5. The propulsion system of claim 1, wherein the set of magnets includes two or more magnets.

6. The propulsion system of claim 1, further comprising a fan blade cowling, wherein the fan blade housing is installed within the fan blade cowling to form a propulsion unit, wherein the fan blade cowling is configured to be affixed to a craft.

7. The propulsion system of claim 6, further comprising a plurality of propulsion units configured to work in unison.

8. The propulsion system of claim 7, further comprising a controller coupled with the magnetic devices of each of the propulsion units independently, and configured to control the interaction between the magnetic devices and the permanent magnets of each of the propulsion units.

9. The propulsion system of claim 1, further comprising a controller coupled with the magnetic devices and configured to control the interaction between the magnetic devices and the permanent magnets.

* * * * *